(12) United States Patent
Kondo

(10) Patent No.: US 7,912,277 B2
(45) Date of Patent: *Mar. 22, 2011

(54) DATA PROCESSING APPARATUS AND DATA PROCESSING METHOD

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/509,530

(22) Filed: Jul. 27, 2009

(65) Prior Publication Data

US 2009/0285472 A1 Nov. 19, 2009

Related U.S. Application Data

(60) Division of application No. 11/348,775, filed on Feb. 7, 2006, now Pat. No. 7,747,069, which is a continuation of application No. 09/434,662, filed on Nov. 5, 1999, now Pat. No. 7,031,513.

(30) Foreign Application Priority Data

Nov. 9, 1998 (JP) .................................... 10-317101

(51) Int. Cl.
*G06K 9/62* (2006.01)
*G05B 13/02* (2006.01)
*G06F 15/18* (2006.01)

(52) U.S. Cl. .............................. 382/155; 700/47; 706/14

(58) Field of Classification Search .................. 382/155; 700/47; 706/14

See application file for complete search history.

(56) References Cited

U.S. PATENT DOCUMENTS

| | | | |
|---|---|---|---|
| 3,950,733 A * | 4/1976 | Cooper et al. ................... 706/26 |
| 4,276,620 A | 6/1981 | Kahn et al. |
| 4,887,306 A | 12/1989 | Hwang et al. |
| 4,941,122 A | 7/1990 | Weideman |
| 5,038,388 A | 8/1991 | Song |
| 5,136,529 A | 8/1992 | Makie et al. |
| 5,253,329 A | 10/1993 | Villarreal et al. |
| 5,294,979 A | 3/1994 | Patel et al. |
| 5,295,061 A | 3/1994 | Katayama |
| 5,353,307 A | 10/1994 | Lester et al. |
| 5,402,520 A | 3/1995 | Schnitta |

(Continued)

FOREIGN PATENT DOCUMENTS

EP 0 280 412 B1 8/1988

(Continued)

OTHER PUBLICATIONS

Bataillou et al., Weighted Averaging With Adaptive Weight Estimation, IEEE, 1992.

(Continued)

*Primary Examiner* — John B Strege
(74) *Attorney, Agent, or Firm* — Frommer Lawrence & Haug LLP; William S. Frommer; Thomas F. Presson

(57) ABSTRACT

A data processing apparatus processes input data and outputs the processed data. The data processing apparatus includes a data processing section and a real-time learning section. The data processing section processes the input data by a predetermined processing method and outputs the processed data. The real-time learning section controls such that the processing method is learned in real time and the data processing section processes the input data by the learned processing method, so that the output data is improved as time elapses.

6 Claims, 20 Drawing Sheets

U.S. PATENT DOCUMENTS

| | | | |
|---|---|---|---|
| 5,408,588 | A | 4/1995 | Ulug |
| 5,446,829 | A | 8/1995 | Wang et al. |
| 5,602,761 | A | 2/1997 | Spoerre et al. |
| 5,684,720 | A | 11/1997 | Hein |
| 5,692,011 | A | 11/1997 | Nobakht et al. |
| 5,694,342 | A | 12/1997 | Stein |
| 5,802,220 | A | 9/1998 | Black et al. |
| 5,812,993 | A | 9/1998 | Ginosar et al. |
| 5,875,216 | A | 2/1999 | Martin |
| 5,909,178 | A | 6/1999 | Balch et al. |
| 5,920,599 | A | 7/1999 | Igarashi |
| 5,963,447 | A | 10/1999 | Kohn et al. |
| 6,034,734 | A | 3/2000 | De Haan et al. |
| 6,049,793 | A | 4/2000 | Tomita |
| 6,064,997 | A | 5/2000 | Jagannathan et al. |
| 6,115,433 | A | 9/2000 | De Lantremange |
| 6,157,403 | A | 12/2000 | Nagata |
| 6,233,365 | B1 * | 5/2001 | Teruhiko .................. 382/298 |
| 6,247,002 | B1 | 6/2001 | Steels |
| 6,278,961 | B1 | 8/2001 | Kadtke et al. |
| 6,285,710 | B1 | 9/2001 | Hurst, Jr. et al. |
| 6,347,310 | B1 | 2/2002 | Passera |
| 6,430,524 | B1 | 8/2002 | Kondo et al. |
| 6,564,180 | B1 | 5/2003 | Kondo et al. |
| 6,581,047 | B1 | 6/2003 | Raykhman et al. |
| 7,031,513 | B1 | 4/2006 | Kondo |

FOREIGN PATENT DOCUMENTS

| | | |
|---|---|---|
| EP | 0 821 322 | 1/1998 |
| EP | 0 847 054 | 6/1998 |
| JP | 09319866 A | 12/1997 |

OTHER PUBLICATIONS

Unser et al., Weighted Averaging of a Set of Noisy Images for Maximum Signal-to-Noise Ratio, IEEE, 1990.

Official U.S. Play Station Magazine, vol. 3, Issue 3 (7 pages; Dec. 1999).

Li L; Haykin S Ed—Institute of Electrical and Electronics Engineers: "A cascaded recurrent neural networks for real-time nonlinear adaptive filtering" Proceedings of the International Conference on Neural Networks (ICNN). San Francisco, Mar. 25-Apr. 1, 1993; 19930328; 19930328-19930401 New York, IEEE, US, vol. -, Mar. 28, 1993, pp. 857-862 XP010111702 ISBN: 978-0-7803-0999-9.

\* cited by examiner

○ : SD PIXEL
× : HD PIXEL

DATA PROCESSING APPARATUS AND DATA PROCESSING METHOD

This is a division of application Ser. No. 11/348,775, filed Feb. 7, 2006, now U.S. Pat. No. 7,747,069, which is a continuation of application Ser. No. 09/434,662, filed on Nov. 5, 1999, now U.S. Pat. No. 7,031,513, issued Apr. 18, 2006, which is entitled to the priority filing date of Japanese application 10-317101 filed on Nov. 9, 1998, the entirety of which is incorporated herein by reference.

BACKGROUND OF THE INVENTION

1. Field of the Invention

The present invention relates to data processing apparatuses and data processing methods, and more particularly, to a data processing apparatus and a data processing method in which a processing method by which input data is processed is learned in real time such that the input data is adaptively processed and output data obtained by the processing is improved as time elapses.

2. Description of the Related Art

FIG. 1 shows a structure of a conventional data processing apparatus.

The input data to be processed is sent to a determination section 91 and processing sections $92_1$ to $92_M$. The processing sections $92_1$ to $92_M$ process the input data by processing methods different from each other and send to a selection section 93.

On the other hand, the determination section 91 controls the selection section 93 such that one of the outputs of the processing sections $92_1$ to $92_M$ is selected according to, for example, the amount of a feature extracted from the input data. The selection section 93 selects one of the outputs of the processing sections $92_1$ to $92_M$ according to the control of the determination section 93 and outputs as output data.

In other words, the processing sections $92_1$ to $92_M$ process the input data by the processing methods different from each other, the determination section 91 selects the most appropriate method among the processing methods of the processing sections $92_1$ to $92_M$ according to the amount of a feature of the input data, and the selection section 93 selects the processing result of the input data obtained by the selected processing method.

Therefore, in the data processing apparatus shown in FIG. 1, when input data is image data and the processing sections $92_1$ to $92_M$ serve as filters having different tap coefficients for filtering the image data, for example, the determination section 91 determines among the processing sections $92_1$ to $92_M$ a filter having the tap coefficient which the designer of the data processing apparatus thinks most appropriate, according to the amount of a feature of the input data. The selection section 93 selects the result obtained when the determined filter filters the input data, as output data.

As described above, in the conventional data processing apparatus, the processing result of the filter having the tap coefficient which the designer of the data processing apparatus thinks most appropriate, among the processing sections $92_1$ to $92_M$ is selected. It is, however, not necessarily true that processing the input data by such a tap coefficient is appropriate for the input data.

In other words, in some cases, filtering with the use of a tap coefficient other than the tap coefficients which the processing sections $92_1$ to $92_M$ have is more appropriate for the input data, and as a result, output data improved more is obtained.

SUMMARY OF THE INVENTION

Accordingly, it is an object of the present invention to solve the foregoing problem.

The foregoing object is achieved in one aspect of the present invention through the provision of a data processing apparatus for processing input data and outputting the processed data, including a data processing section for processing the input data by a predetermined processing method and outputting the processed data, and a real-time learning section for controlling such that the processing method is learned in real time and the data processing section processes the input data by the learned processing method, so that the output data is improved as time elapses.

The foregoing object is achieved in another aspect of the present invention through the provision of a data processing method for processing input data and outputting the processed data, including a data processing step for processing the input data by a predetermined processing method and outputting the processed data, and a real-time learning step for controlling such that the processing method is learned in real time and the input data is processed by the learned processing method in the data processing step, so that the output data is improved as time elapses.

DESCRIPTION OF THE PREFERRED EMBODIMENTS

Figure 1:
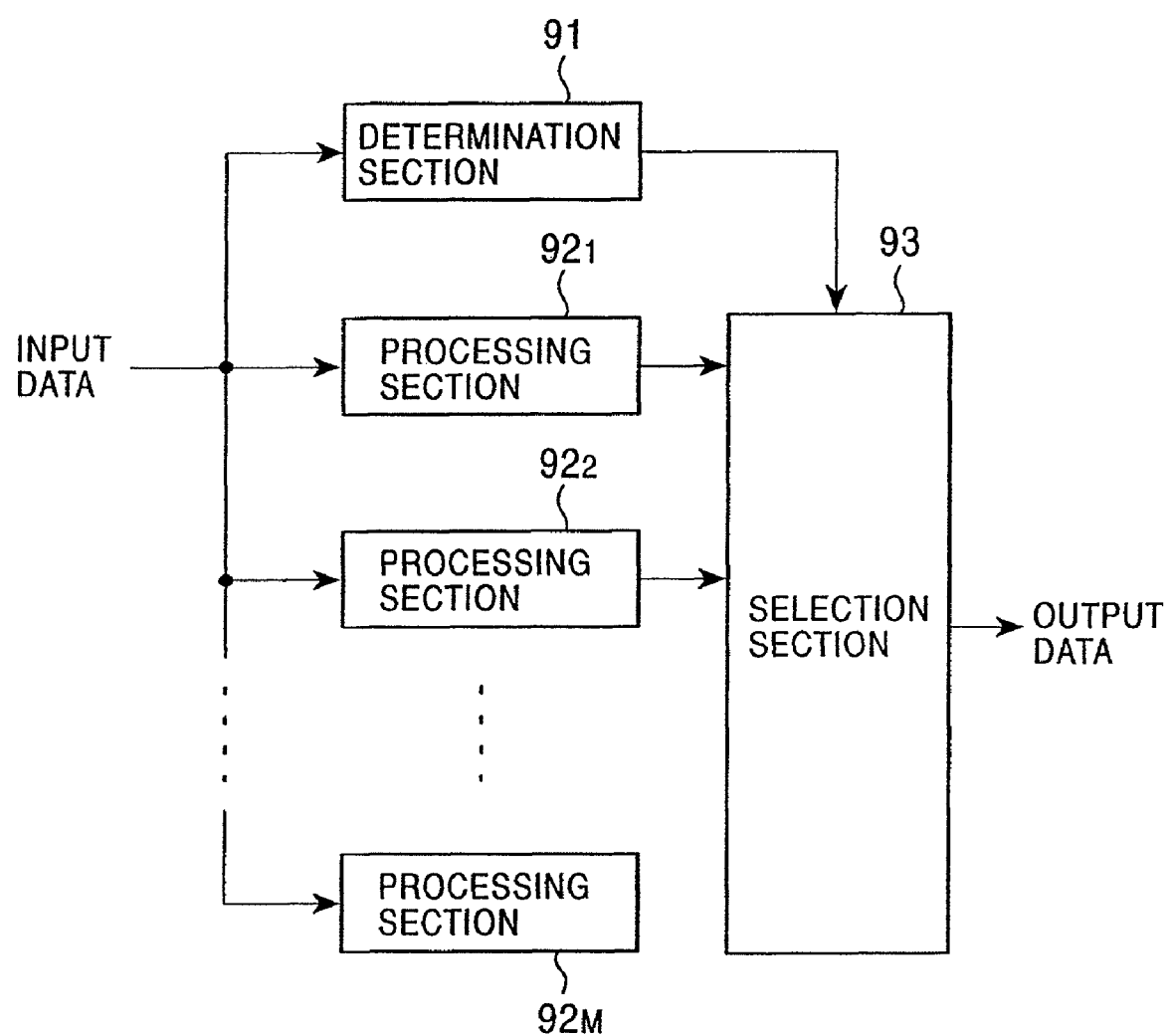
FIG. 1 is a block diagram showing a structure of a conventional data processing apparatus.
Figure 2:
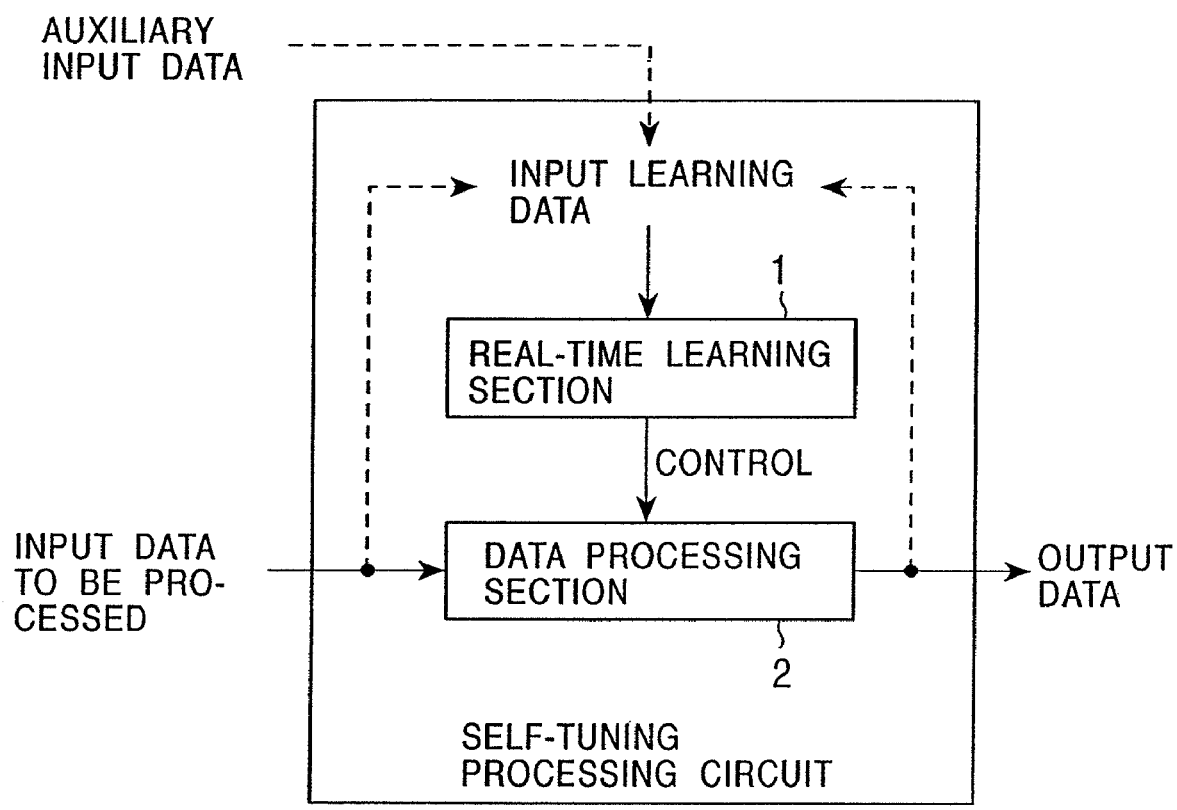
FIG. 2 is a block diagram of an example structure of a self-tuning processing circuit according to an embodiment of the present invention.

FIG. 2 shows an example structure of a self-tuning processing circuit according to an embodiment of the present invention.

In this self-tuning processing circuit, processing is applied to input data, for example, digital data, subjective to the processing, namely, input data to be processed, by the most appropriate processing method, and the result of the processing is output as output data.

Specifically, the self-tuning processing circuit is formed of a real-time learning section 1 or real-time learning means, and a data processing section 2 or data processing means.

The real-time learning section 1 receives learning input data used for learning the processing method by which the input data to be processed is processed. The real-time learning section 1 controls the data processing section 2 such that the processing method is learned in real time according to the learning input data and the processing method obtained as the result of the learning is used for processing, in order to adaptively process the input data to be processed so that the output data is improved as time elapses.

The data processing section 2 adaptively processes the input data to be processed by the processing method specified by the real-time learning section 1, and outputs the result of the processing as output data.

Therefore, since the data processing section 2 processes the input data to be processed by the use of the processing method learned in real time as described above, the processing is adaptively applied to the input data to be processed. The output data obtained by adaptively processing the input data to be processed is improved as time elapses.

More specifically, the processing method by which the data processing section 2 processes the input data to be processed is improved by real-time learning in the real-time learning section 1. The data processing section 2 adaptively processes the input data to be processed by the use of the processing method specified by the real-time learning section 1. As time elapses or the amount of input data processed increases, a learning effect gradually appears, and the output data output from the data processing section 2 is improved as time elapses. The improvement of the output data means that the processing method of the data processing section 2 is improved so as to be appropriate for processing the input data to be processed, as time elapses.

As described above, in the self-tuning processing circuit, the processing method for the input data to be processed is learned in real time and the input data to be processed is processed by the processing method obtained as the result of the learning such that the output data is improved as time elapses. In other words, the processing appropriate for the input data to be processed is applied to itself as learning proceeds. Therefore, the processing which the self-tuning processing circuit shown in FIG. 2 performs can be called self-tuning processing.

An improvement of the output data means, for example, an image-quality improvement when the input data to be processed is an image. More specifically, it means an improvement of the S/N ratio or resolution. When the purpose of the processing in the data processing section 2 is an effect such as smoothing or edge emphasis, the improvement of the output data means that the effect greatly appears. Therefore, the improvement of the output data means that the output data is improved so that output data having a state which the user desires is obtained.

The real-time learning section 1 learns in real time the processing method used for processing the input data to be processed, according to the input learning data input to the section. As shown by dotted lines in FIG. 2, the input learning data is the input data to be processed, input to the data processing section 2, the output data, such as the frequency characteristics of the input data to be processed, output from the data processing section 2, or further, an auxiliary input data sent to the self-tuning processing circuit to perform learning of the processing method applied to the input data to be processed. Two or more of the above data may be used as input learning data.

In the self-tuning processing circuit, the processing method of the data processing section 2 is improved every moment when the real-time learning section 1 learns in real time. Therefore, the self-tuning processing circuit is a so-called change-with-time system. The improvement of the processing method can be roughly divided into a case in which the algorithm of the processing is changed and a case in which the contents of processing steps constituting the series of processing or elements constituting the processing are changed.

When "x" indicates the input data to be processed and "y" indicates output data, for example, the processing in the data processing section 2 is expressed by an expression of $y=f(x)$ with the use of a function "f( )".

Figure 3A:
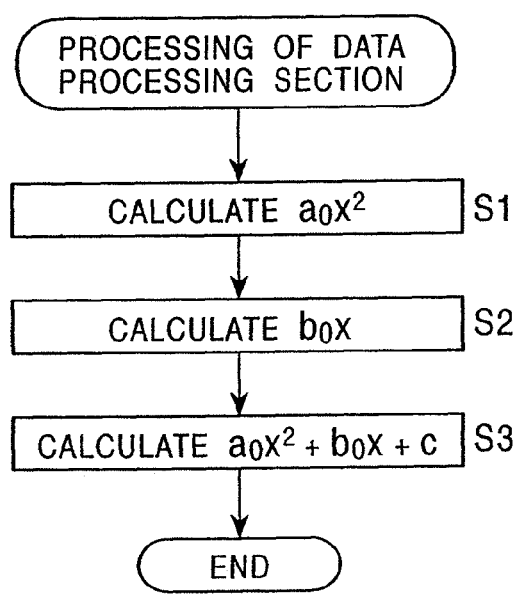
FIG. 3A is a flowchart of a processing method used before an algorithm is changed.

When the expression is set to "$f(x)=a_0x^2+b_0x+c_0$," for example, the processing of the data processing section 2 used before an algorithm is changed can be expressed by a flowchart shown in FIG. 3A.

In a step S1, $a_0x^2$ is calculated. In a step S2, $b_0x$ is calculated. Then, in a step S3, $a_0x^2+b_0x+c_0$ is calculated to obtain the output data "y."

In this case, changing the form of the function "f(x)" corresponds to changing the algorithm of the processing. More specifically, changing the function from "$f(x)=a_0x^2+b_0x+c_0$" to "$f(x)=(a_0x^2+b_0x+c_0)^2$," for example, corresponds to changing the algorithm of the processing.

Figure 3B:
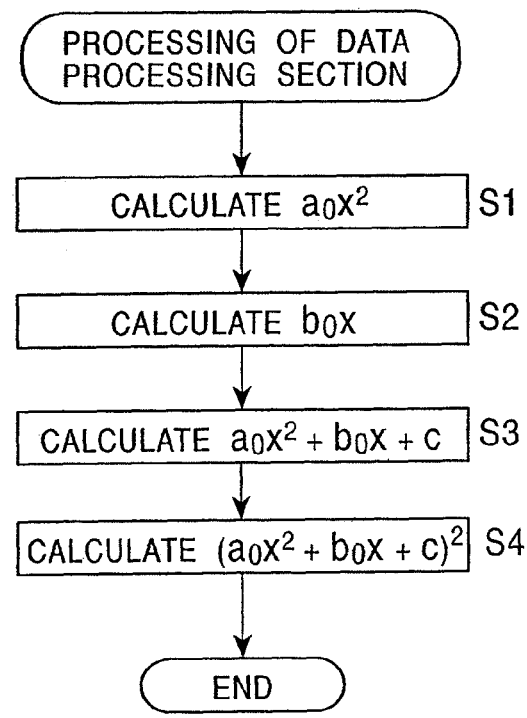
FIG. 3B is a flowchart of a processing method used after the algorithm is changed.

In this case, the processing of the data processing section 2 after the algorithm is changed can be expressed, for example, by a flowchart shown in FIG. 3B.

Specifically, in steps S1 to S3, the same processing as that shown in FIG. 3A is executed, and $(a_0x^2+b_0x+c_0)^2$ is calculated to obtain the output data "y."

As clearly understood from the comparison between the flowchart shown in FIG. 3A and that shown in FIG. 3B, when the algorithm of the processing is changed, the flowchart which expresses the processing is also changed accordingly.

Changing a coefficient of the function "f(x)" corresponds to changing the contents of an element constituting the processing. Specifically, for example, changing the function from "$f(x)=a_0x^2+b_0x+c_0$" to "$f(x)=a_1x^2+b_1x+c_1$" corresponds to changing the contents of the elements constituting the processing.

Figure 4A:
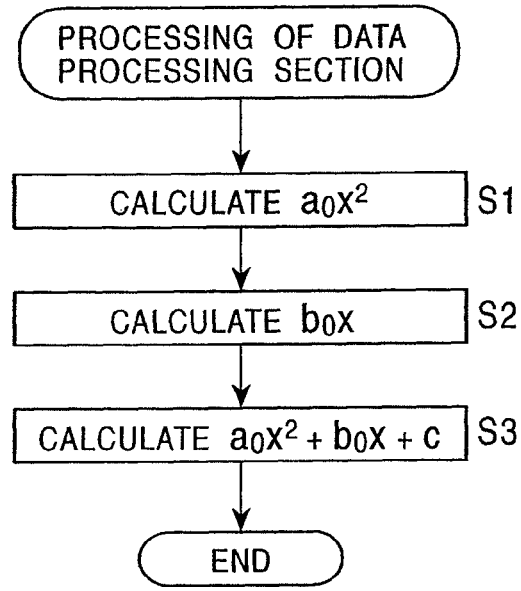
FIG. 4A is a flowchart of a processing method used before processing elements are changed.
Figure 4B:
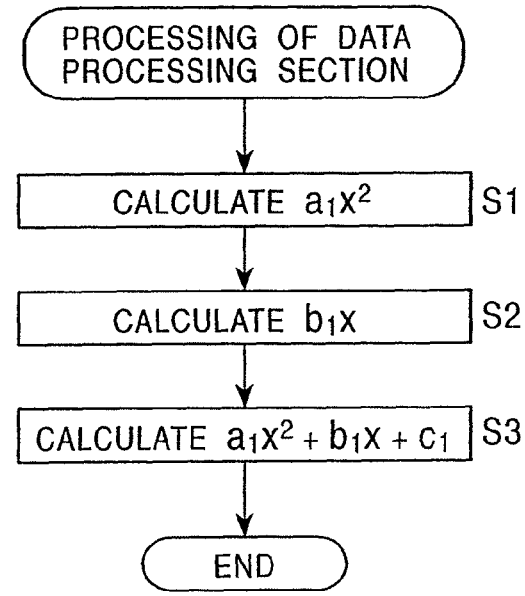
FIG. 4B is a flowchart of a processing method used after the processing elements are changed.

In this case, the processing of the data processing section 2 is changed from the processing shown by a flowchart in FIG. 4A, which is the same as that shown in FIG. 3A, to, for example, the processing shown by a flowchart in FIG. 4B.

Specifically, in this case, $a_1x^2$ is calculated in a step S1, $b_1x$ is calculated in a step S2, and then, $a_1x^2+b_1x+c_1$ is calculated in a step S3 to obtain the output data "y."

As clearly understood from the comparison between the flowchart shown in FIG. 4A and that shown in FIG. 4B, when the coefficients of the function "f(x)" are changed, the contents of steps constituting the processing are changed accordingly. More specifically, in FIGS. 4A and 4B, the contents of the step S1 is changed from the calculation of $a_0x^2$ to that of $a_1x^2$, the contents of the step S2 is changed from the calculation of $b_0x$ to that of $b_1x$, the contents of the step S3 is changed from $a_0x^2+b_0x+c_0$ to $a_1x^2+b_0x+c_1$.

In some cases, the processing method is improved both by changing the algorithm of the processing and by changing the contents of an element constituting the processing.

The functions used in FIGS. 3A and 3B and FIGS. 4A and 4B are just examples used to describe an improvement of the processing method. Whether the output data is actually improved is irrelevant to the fact that the function expressing the processing of the data processing section 2 is changed as described above.

The self-tuning processing circuit differs, for example, from conventional digital filters in that the coefficients of the function f(x) are changed by real-time learning according to newly generated adaptive coefficients. Specifically, in the conventional digital filters, a tap coefficient may be changed according to input data to a coefficient prepared in advance, which is not generated by real-time learning. In other words, in the conventional digital filters, a tap coefficient which the system designer thinks is appropriate for input data is selected among tap coefficients prepared in advance. A tap coefficient adaptive to input data is not obtained. As a result, even if a tap coefficient more appropriate for the input data exists, it cannot be used unless it is prepared in advance. Therefore, the above conventional digital filters are called in some cases systems changing a tap coefficient "adaptively," but accurately speaking, it is not "adaptively" but "selectively." They are systems in which a tap coefficient adaptive to input data is not generated but a tap coefficient selected uniquely against the input data is used.

In contrast, in the self-tuning processing circuit, a tap coefficient is generated by real-time learning such that input data is adaptively processed. In other words, the input data is processed by the tap coefficient truly most appropriate for the input data. More specifically, for example, whereas in the conventional digital filters, for example, when two sets of tap coefficients are prepared in advance, one of the two sets of tap coefficients which the system designer thinks is appropriate for the input data is uniquely selected and used, tap coefficients used for processing the input data are improved every moment by real-time learning to obtain tap coefficients more appropriate for the input data, and processing is executed with the use of such tap coefficients in the self-tuning processing circuit. Therefore, processing adaptive to the input data is performed.

In addition, the self-tuning processing circuit differs from conventional processing which applies tuning processing to input data but output data is not improved every moment, such as adaptive dynamic range coding (ADRC) processing, in that output data is improved every moment. Specifically, in the ADRC processing, the maximum value MAX and the minimum value MIN of the pixel values of pixels constituting a block in an image are detected, and the pixel values of the pixels constituting the block are re-quantized in K bits according to a local dynamic range DR obtained by MAX-MIN in the block. More specifically, the minimum value MIN is subtracted from the value of each pixel in the block and the difference is divided by $DR/2^K$ for re-quantization. Therefore, tuning processing is applied to input data in that the quantization step $DR/2^K$ of the pixel values is obtained according to the block dynamic range DR and the pixel values are quantized by the quantization step $DR/2^K$, but output data obtained as the quantization results is not improved every moment.

The real-time learning section 1 uses all the sample values of input learning data obtained so far in order to improve the output data as time elapses in real-time learning at the current time "t." The output data of the data processing section 2 may be more effectively improved if the real-time learning section 1 gives a weight to sample values obtained at positions close in a time manner to the current time "t" of the input learning data and does not use sample values obtained at positions far from the current time much. Therefore, the real-time learning section 1 can execute real-time learning such that the above-described weight is given to input learning data, namely, the sample values of input learning data obtained at positions in a time manner far from the current time "t" are ignored according to the rates corresponding to the degrees of the time differences. Alternatively, it is possible that the real-time learning section 1 uses only input learning data obtained within a predetermined time period from the current time "t." Specifically, for example, as shown in FIG. 5, the real-time learning section 1 can use only input learning data within four samples from the current time "t" for real-time learning at the current time "t." This can be implemented by applying a weight of zero to input learning data away from the current time "t" by five or more sample periods.

Figure 5:
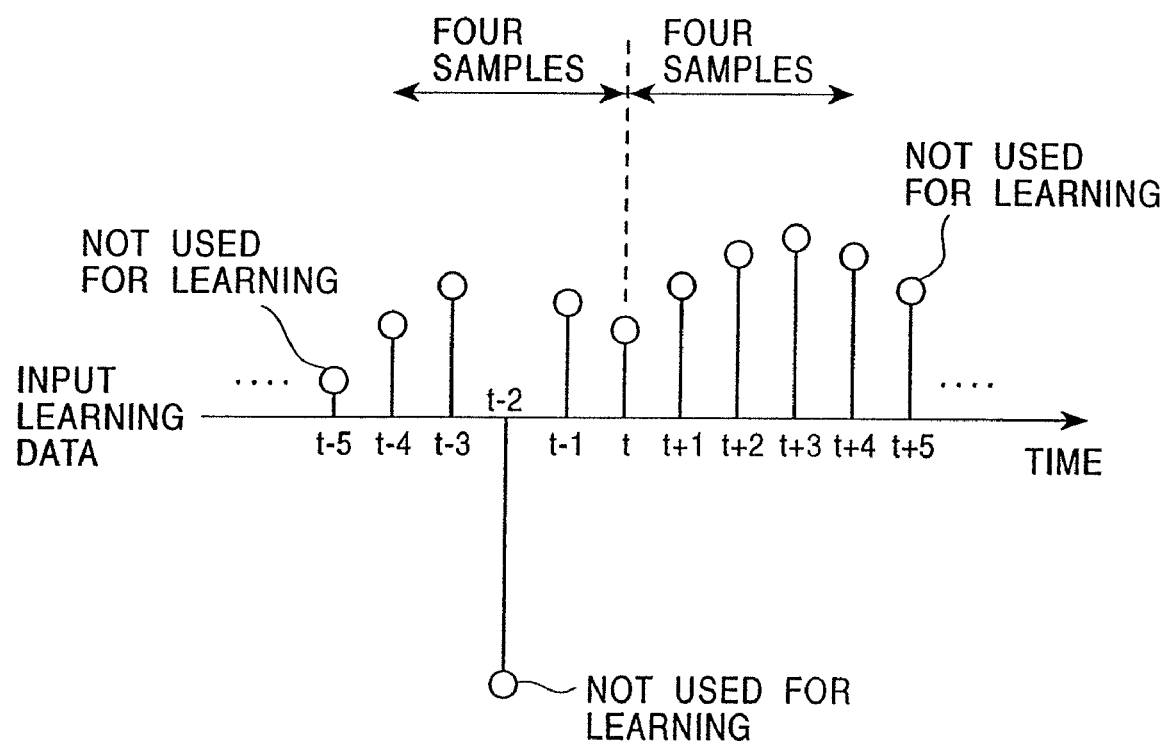
FIG. 5 is a view showing input learning data used for learning.

In real-time learning at the current time "t," it is also possible that the real-time learning section uses only sample values within a predetermined range from the sample value of the input learning data obtained at the current time "t." Specifically, for example, in FIG. 5, a sample value such as that of the learning data obtained at the time "t-2" has a magnitude largely different from that of the sample value of the input learning data obtained at the current time "t" may adversely affect the learning in the real-time learning section 1. Therefore, it is possible not to use, namely, to give a weight of zero to, a sample value having a magnitude largely different from that of the input learning data obtained at the current time "t" in real-time learning at the current time "t" in the real-time learning section 1.

Figure 6:
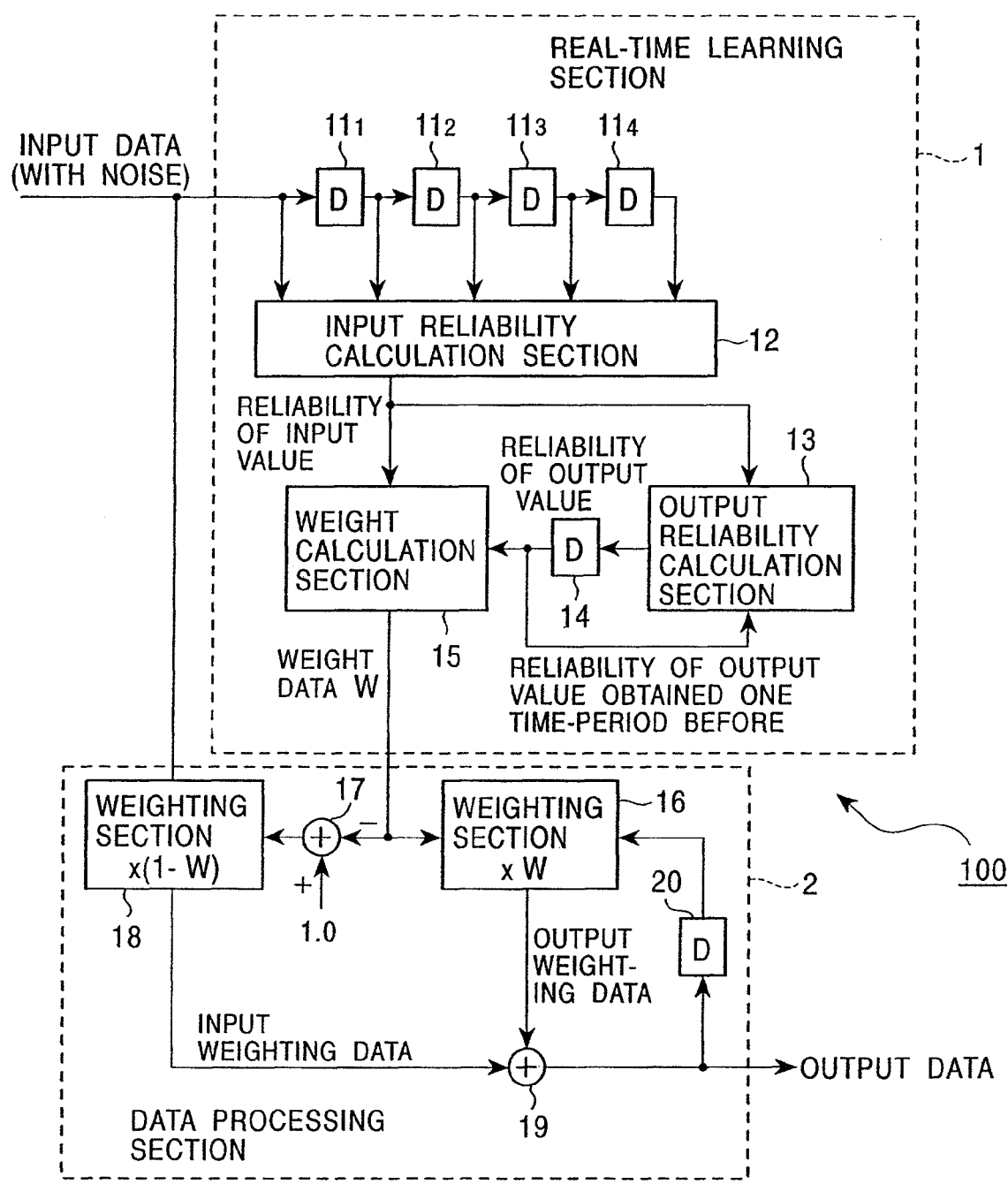
FIG. 6 is a block diagram showing an example structure of an NR processing circuit according to an embodiment of the present invention.

FIG. 6 shows an example structure of a noise reduction (NR) processing circuit 100 to which the self-tuning processing circuit shown in FIG. 2 is applied, according to an embodiment.

When input data having noise is input to this NR processing circuit 100, the NR processing circuit applies self-tuning processing to the input data to effectively remove the noise from the input data and outputs output data.

Figure 7A:
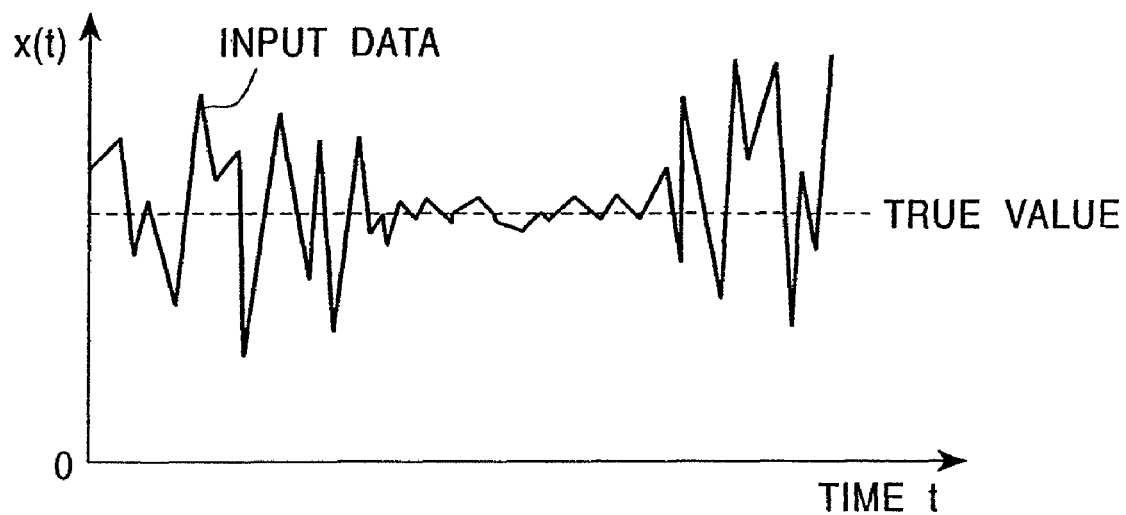
FIG. 7A is a view showing the input data to be processed by the NR processing circuit shown in FIG. 6.

Specifically, for example, to simplify a description, a case is examined in which input data having a constant true value and on which noise fluctuating in time is superposed, as shown in FIG. 7A, is averaged to remove the noise fluctuating in time. The noise is effectively removed by setting a weight for input data having a large noise level, namely, having a low S/N ratio, to a small value and by setting a weight for input data having a small noise level, namely, having a high S/N ratio, to a large value.

Figure 7B:
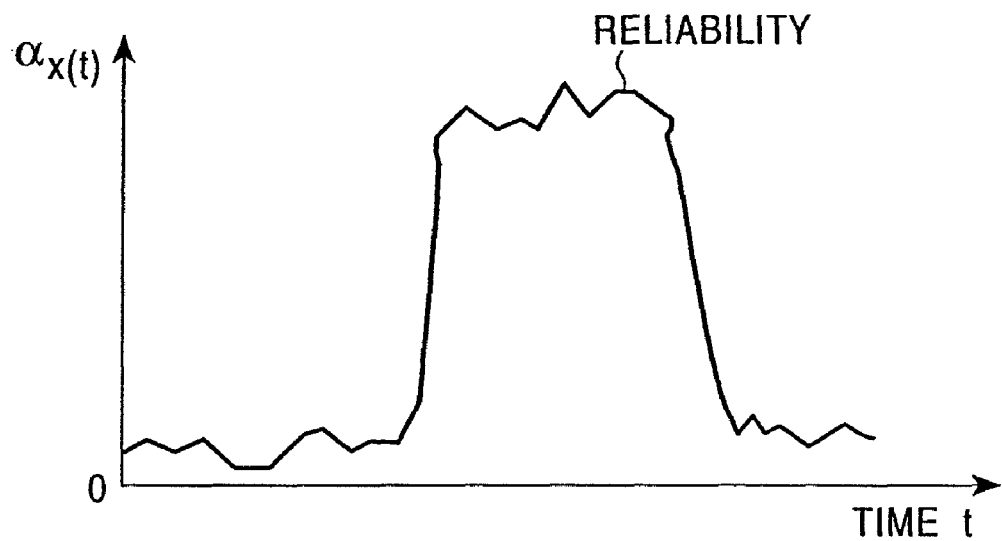
FIG. 7B is a view showing the reliability of the input data to be processed by the NR processing circuit shown in FIG. 6.

In the NR processing circuit 100 shown in FIG. 6, as the evaluation value of input data, the degree of reliability indicating how the input data is close to the true value, which is the reliability of the input data against the true value, for example, shown in FIG. 7B, is obtained by real-time learning. The NR processing circuit 100 calculates its average while the weight corresponding to the reliability is applied to the input data, to effectively remove the noise.

Therefore, since the NR processing circuit 100 shown in FIG. 6 obtains a weighted average of the input data by the use of the weight corresponding to its reliability and outputs it as output data. The output data y(t) is obtained from the following expression, where x(t), y(t), and $\alpha_{x(t)}$ indicate the input data, the output data, and the reliability of the input data at the time "t" in the NR processing circuit 100, respectively.

$$y(t) = \frac{\sum_{i=0}^{t} \alpha_{x(i)} x(i)}{\sum_{i=0}^{t} \alpha_{x(i)}} \quad (1)$$

It is assumed here that a larger weight is given to the higher degree of reliability $\alpha_{x(t)}$ of input data.

The output data "y(t−1)," obtained one sample before the current time "t," is calculated as follows from the expression (1).

$$y(t-1) = \frac{\sum_{i=0}^{t-1} \alpha_{x(i)} x(i)}{\sum_{i=0}^{t-1} \alpha_{x(i)}} \quad (2)$$

As for the output data y(t), the degree of reliability $\alpha_{y(t)}$ indicating how the output data y(t) is close to the true value, which is the reliability of the output data y(t) against the true value, is introduced as an evaluation value of the output data y(t). The reliability $\alpha_{y(t-1)}$ of the output data y(t−1), obtained one sample before the current time "t," is defined by the following expression.

$$\alpha_{y(t-1)} = \sum_{i=0}^{t-1} \alpha_{x(i)} \quad (3)$$

In this case, the output data "y(t)" and its reliability $\alpha_{y(t)}$ are expressed as follows with the use of the expressions (1) to (3).

$$y(t) = \frac{\alpha_{y(t-1)} y(t-1)}{\frac{t-1}{\sum_{i=0}^{t-1} \alpha_{x(i)} x(i) + \alpha_{x(t)} x(t)}{\sum_{i=0}^{t-1} \alpha_{x(i)} + \alpha_{x(t)}}} \quad (4)$$

$$= \frac{\alpha_{y(t-1)} y(t-1) + \alpha_{x(t)} x(t)}{\alpha_{y(t-1)} + \alpha_{x(t)}}$$

$$\alpha_{y(t)} = \alpha_{y(t-1)} + \alpha_{x(t)}$$

The weight used to obtain the output data y(t) at the time "t" is indicated by w(t), and defined by the following expression.

$$w(t) = \alpha_{y(t-1)}/(\alpha_{y(t-1)} + \alpha_{x(t)}) \quad (5)$$

From the expression (5), the following expression is satisfied.

$$1 - w(t) = \alpha_{x(t)}/(\alpha_{y(t-1)} + \alpha_{x(t)}) \quad (6)$$

With the use of the expressions (5) and (6), the output data y(t) in the expression (4) can be expressed in the following way by a weighted average obtained by multiplications and an addition.

$$y(t) = w(t)y(t-1) + (1-w(t))x(t) \quad (7)$$

The weight w(t) (and 1−w(t)) used in the expression (7) can be obtained from the expression (5) with the use of the reliability $\alpha_{y(t-1)}$ of the output data y(t−1) obtained one sample before and the reliability $\alpha_{x(t)}$ of the current input data x(t). The reliability $\alpha_{y(t)}$ of the current output data y(t) in the expression (4) can also be obtained with the use of the reliability $\alpha_{y(t-1)}$ of the output data y(t−1) obtained one sample before and the reliability $\alpha_{x(t)}$ of the current input data x(t).

When the reliability $\alpha_{x(t)}$ of the input data x(t) and the reliability $\alpha_{y(t)}$ of the output data y(t) are expressed, respectively, by the reciprocals of the corresponding dispersions $\sigma_{x(t)}^2$ or $\sigma_{y(t)}^2$, in other words, when the reliability $\alpha_{x(t)}$ and the reliability $\alpha_{y(t)}$ are set as follows, $$\alpha_{x(t)} = 1/\sigma_{x(t)}^2$$

$$\alpha_{y(t)} = 1/\sigma_{y(t)}^2 \quad (8)$$

the weight w(t) in the expression (5) can be expressed by the following expression.

$$w(t) = \sigma_{x(t)}^2/(\sigma_{y(t-1)}^2 + \sigma_{x(t)}^2) \quad (9)$$

In this case, 1−w(t) defined by the expression (6) can be expressed by the following expression.

$$1 - w(t) = \sigma_{y(t-1)}^2/(\sigma_{y(t-1)}^2 + \sigma_{x(t)}^2) \quad (10)$$

A term, $\sigma_{y(t)}^2$ can be expressed by the following expression with the use of the expressions (4), (8), and (9).

$$\sigma_{y(t)}^2 = w(t)^2 \sigma_{y(t-1)}^2 + (1-w(t))^2 \sigma_{x(t)}^2 \quad (11)$$

The NR processing circuit 100 shown in FIG. 6 learns the weight w(t) in real time according to the expression (5) and 1−w(t) in real time according to the expression (6), with the input data x(t) and the output data y(t) being used as input learning data. The NR processing circuit 100 calculates the weighted average of the output data y(t−1) obtained one sample before and the current input data x(t) according to the expression (7) with the use of the weight w(t) obtained as a result of real-time learning to adaptively process the input data x(t) so that the noise included in the input data x(t) is effectively removed. With these operations, the S/N ratio of the output data y(t) output from the NR processing circuit 100 is improved as time elapses.

A latch circuit 11₁ receives input data. The latch circuit 11₁ latches the received input data, for example, in synchronization with the timing when the input data is received, and sends it to a subsequent-stage latch circuit 11₂ and to an input reliability calculation section 12. The latch circuit 11₂ and a latch circuit 11₃ latch the input data output from the previous-stage latch circuits 11₁ and 11₂, and send it to the subsequent-stage latch circuits 11₃ and 11₄, respectively, and to the input reliability calculation section 12, in the same way as the latch circuit 11₁. The latch circuit 11₄ latches the input data output from the previous-stage latch circuit 11₃ and sends it to the input reliability calculation section 12.

The input reliability calculation section 12 receives the same input data as that sent to the latch circuit 11₁ in addition to the input data latched by the latch circuits 11₁ to 11₄. Therefore, when input data x(t) is sent to the latch circuit 11₁ and to the input reliability calculation section 12, the input reliability calculation section 12 also receives input data x(t−1) to x(t−4) latched by the latch circuits 11₁ to 11₄. The input reliability calculation circuit 12 calculates, for example, the dispersion of input data from the input data x(t) to x(t−4), and sends the reciprocal of the dispersion as the reliability $\alpha_{x(t)}$ (that is, an input reliability) of the input data x(t) to an output reliability calculation section 13 and to a weight calculation section 15.

The output reliability calculation section 13 obtains the reliability $\alpha_{y(t)}$ (that is, an output reliability) of the output data y(t) according to the expression (4) with the use of the input reliability $\alpha_{x(t)}$ sent from the input reliability calculation section 12 and the output of a latch circuit 14, and outputs it to the latch circuit 14.

The latch circuit 14 latches the output reliability $\alpha_{y(t)}$ sent from the output reliability calculation section 13, for example, in synchronization with latching of the input data x(t), and sends it to the output reliability calculation section 13 and the weight calculation section 15. Therefore, the latch circuit 14 sends the output reliability $\alpha_{y(t-1)}$ obtained one sample before, to the output reliability calculation section 13 and the weight calculation section 15.

The weight calculation section 15 obtains a weight w(t) according to the expression (5) with the use of the input reliability $\alpha_{x(t)}$ sent from the input reliability calculation section 12 and the output reliability $\alpha_{y(t-1)}$ sent from the latch circuit 14, and sends it to a weighting section 16 and an operation section 17.

The latch circuits 11₁ to 11₄, the input reliability calculation section 12, the output reliability calculation section 13, the latch circuit 14, and the weight calculation section 15, described above, correspond to the real-time learning section shown in FIG. 2.

The weighting section 16 multiplies the weight w(t) sent from the weight calculation section 15 by the output of a latch circuit 20, and sends the multiplication result to an operation section 19. The operation section 17 subtracts the weight w(t) sent from the weight calculation section 15, from one, and sends the subtraction result, 1−w(t), to a weighting section 18. The weighting section 18 receives the input data x(t) as well as the output of the operation section 17. The weighting section 18 multiplies the input data x(t) by the output of the operation section 17, and sends the multiplication result to the operation section 19. The operation section 19 adds the outputs of the weighting sections 16 and 18, outputs the addition result as output data y(t), and sends it to the latch circuit 20. The latch circuit 20 latches the output data of the operation section 19, for example, in synchronization with latching of the input data x(t), and sends it to the weighting section 16.

The weighting section 16, the operation section 17, the weighting section 18, the operation section 19, and the latch circuit 20, described above, correspond to the data processing section 2 shown in FIG. 2, and calculate the weighted average according to the expression (7) and outputs it as the output data y(t).

Figure 8:
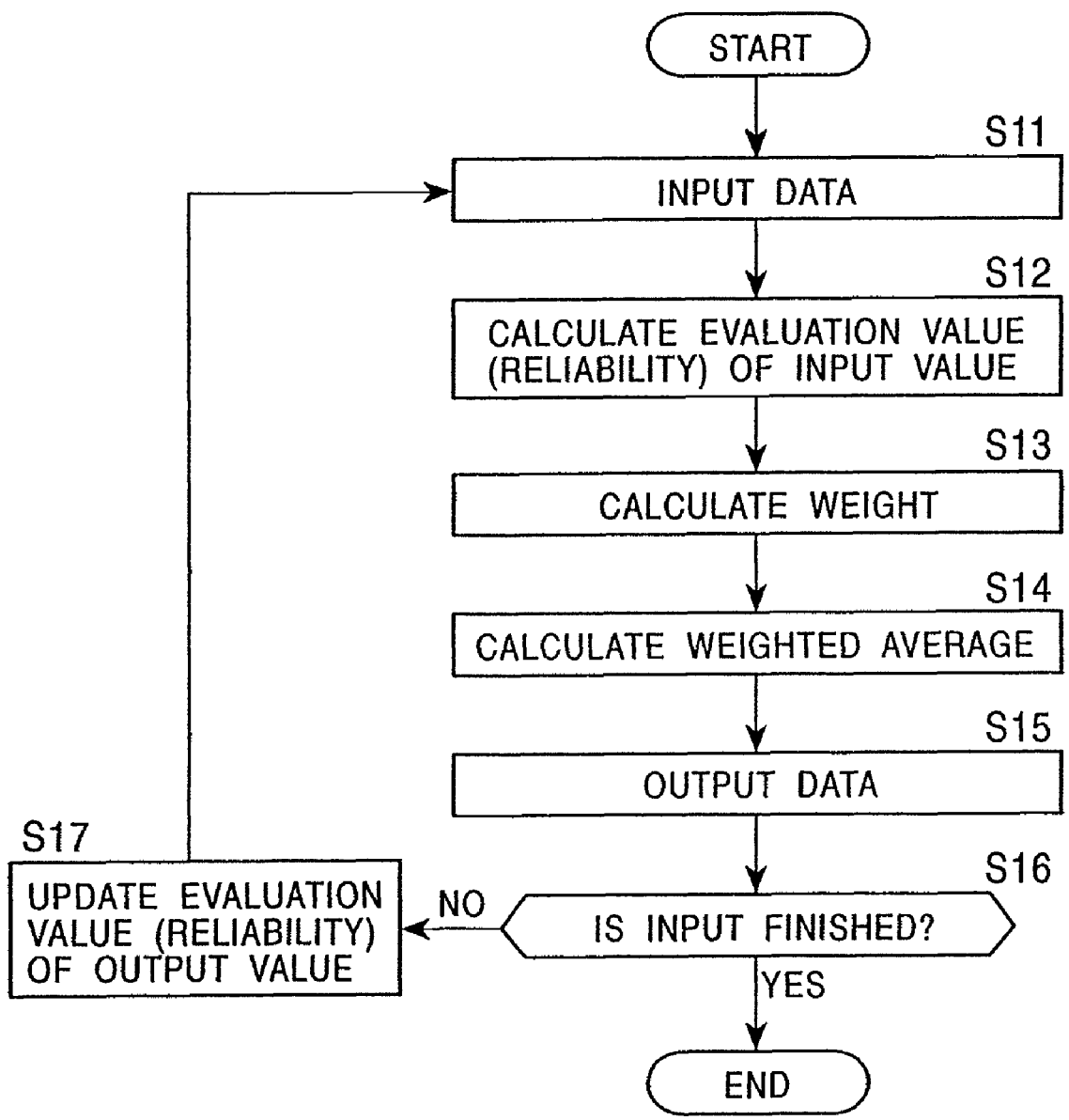
FIG. 8 is a flowchart showing the processing of the NR processing circuit shown in FIG. 6.

The operation of the NR processing circuit 100 shown in FIG. 6 will be described below by referring to a flowchart shown in FIG. 8. The operation of the NR processing circuit 100 and the control of each functional block is achieved by a controller not shown. Alternatively, the entire NR processing algorithm may be implemented by software.

First, the input data x(t) is input to the latch circuit 11₁, the input reliability calculation section 12, and the weighting section 18 in a step S11.

In the next step S12, the input reliability calculation section 12 obtains the input reliability $\alpha_{x(t)}$.

More specifically, the latch circuit 11₁ latches the received input data in synchronization with the timing when the input data is received, and sends it to the subsequent-stage latch circuit 11₂ and to the input reliability calculation section 12.

The latch circuit 11₂ and the latch circuit 11₃ latch the input data output from the previous-stage latch circuits 11₁ and 11₂ and send the data to the subsequent-stage latch circuits 11₃ and 11₄ and to the input reliability calculation section 12, respectively, in the same way as the latch circuit 11₁. The latch circuit 11₄ latches the input data output from the previous-stage latch circuit 11₃ and sends it to the input reliability calculation section 12. Therefore, the input reliability calculation section 12 receives the input data x(t−1) to x(t−4) from the latch circuits 11₁ to 11₄, respectively, at the same time when it receives the input data x(t). The input reliability calculation section 12 uses the input data x(t) to x(t−4) to obtain the input reliability $\alpha_{x(t)}$ and sends it to the output reliability calculation section 13 and to the weight calculation section 15, as described above.

At the timing when the input reliability calculation section 12 sends the input reliability $\alpha_{x(t)}$ to the weight calculation section 15, the latch circuit 14 latches the output reliability $\alpha_{y(t-1)}$ output from the output reliability calculation section 13 one sample before. In a step S13, the weight calculation section 15 uses the input reliability $\alpha_{x(t)}$ sent from the input reliability calculation section 12 and the output reliability $\alpha_{y(t-1)}$ latched by the latch circuit 14 to obtain the weight w(t) according to the expression (5). This weight w(t) is sent to the weighting section 16 and the operation section 17.

The weighting section 16, the operation section 17, the weighting section 18, the operation section 19, and the latch circuit 20 use the weight (t) output from the weight calculation section 15 to calculate the weighted average of the input data x(t) and the output data y(t−1) obtained one sample before, according to the expression (7).

Specifically, the weighting section 16 multiplies the output of the latch circuit 20 by the weight w(t) sent from the weight calculation section 15, and sends the multiplication result to the operation section 19. The latch circuit 20 latches the output data y(t−1) which the operation section 19 outputs the last time, at the timing when the weighting calculation section 15 outputs the weight w(t). Therefore, the weighting section 16 obtains the product w(t)y(t−1) of the output data y(t−1) and the weight w(t) and sends it to the operation section 19.

The operation section 17 subtracts the weight w(t) sent from the weight calculation section 15, from one, and sends the subtraction value, 1−w(t), to the weighting section 18. The weighting section 18 multiplies the output, 1−w(t), of the operation section 17 by the input data x(t) and sends the multiplication result, (1−w(t))x(t), to the operation section 19.

The operation section 19 adds the output, w(t)y(t−1), of the weighting section 16 and the output, (1−w(t))x(t), of the weighting section 18. In other words, with the use of the weight w(t) output from the weight calculation section 15, the weighted average of the input data x(t) and the output data y(t−1) obtained one sample before is calculated according to the expression (7).

This weighted average is output as the output data y(t) in a step S15. The output data y(t) is sent to the latch circuit 20 and latched.

In the next step S16, it is determined by the controller whether the input data to be processed still exists. When it is determined in the step S16 that the input data to be processed still exists, the procedure proceeds to a step S17 and the output reliability calculation section 13 updates the output reliability. Specifically, the output reliability calculation section 13 adds the input reliability $\alpha_{x(t)}$ calculated in the step S12 by the input reliability calculation section 12 and the output reliability $\alpha_{y(t-1)}$ obtained one sample before and latched by the latch circuit 14, according to the expression (4)

to obtain the current output reliability $\alpha_{y(t)}$, and sends it to the latch circuit 14. Then, the procedure returns to the step S11, and the same processing is repeated with the next input data.

On the other hand, when it is determined by the controller in the step S16 that the input data to be processed does not exist, the processing is terminated.

As described above, the weight w(t) is calculated by the use of the input reliability $\alpha_{x(t)}$ of the current input data x(t) and the output reliability $\alpha_{y(t-1)}$ obtained one sample before. Then, according to this weight w(t), the weighted average of the current input data x(t) and the output data y(t−1) obtained one sample before is calculated, and output as the output data y(t) serving as the processing result of the input data x(t). The output reliability $\alpha_{y(t)}$ of the output data y(t) is then calculated by adding the current input reliability $\alpha_{x(t)}$ to the output reliability $\alpha_{y(t-1)}$ obtained one sample before. In the same way, the next input data x(t+1), x(t+2), . . . is sequentially processed. Therefore, the weight w(t) is learned such that portions having high noise levels are not much taken into account and portions having low noise levels are sufficiently taken into account in previous input data. In other words, the NR processing circuit 100 obtains a weight w(t) adaptive to input data, and as a result, improves the output data every moment as learning of the weight w(t) proceeds. The NR processing circuit 100 is configured such that output data obtained by effectively removing noise from the input data is output.

In the above-described case, the reciprocal of the dispersion of the input data, obtained with the use of the past four samples and the current input data, is used as the input reliability $\alpha_{x(t)}$. The input reliability $\alpha_{x(t)}$ can be, for example, the reciprocal of the error square of the current input data against the average of input data, obtained with the use of the past four samples and the current input data, or the sum of the reciprocal of the dispersion and that of the error square. Instead of the past four samples, all input data may be used for calculation.

The NR processing circuit 100 shown in FIG. 6 can also be applied, for example, to a case in which noise is removed from image data or sound data.

In the above embodiment, the NR processing circuit 100 shown in FIG. 6 has been described in the viewpoint of noise reduction. The NR processing circuit 100 shown in FIG. 6 has a self-tuning processing nature, in which a processing method, specifically, a weight coefficient w(t), is learned in real time and the processing is executed by the processing method obtained as a result of the learning such that input data is adaptively processed to improve output data as time elapses, and therefore the input data is adaptively processed. The NR processing circuit 100 shown in FIG. 6 can also achieve, for example, waveform shaping most appropriate for input data In the above case, the NR processing circuit 100 multiplies the output data y(t−1) by the weight w(t) and the input data x(t) by the weight, 1−w(t), in the expression (7) to obtain the output data y(t). It is also possible that either the output data y(t−1) or the input data x(t) is multiplied by a weight to obtain an output data y(t).

Figure 9:
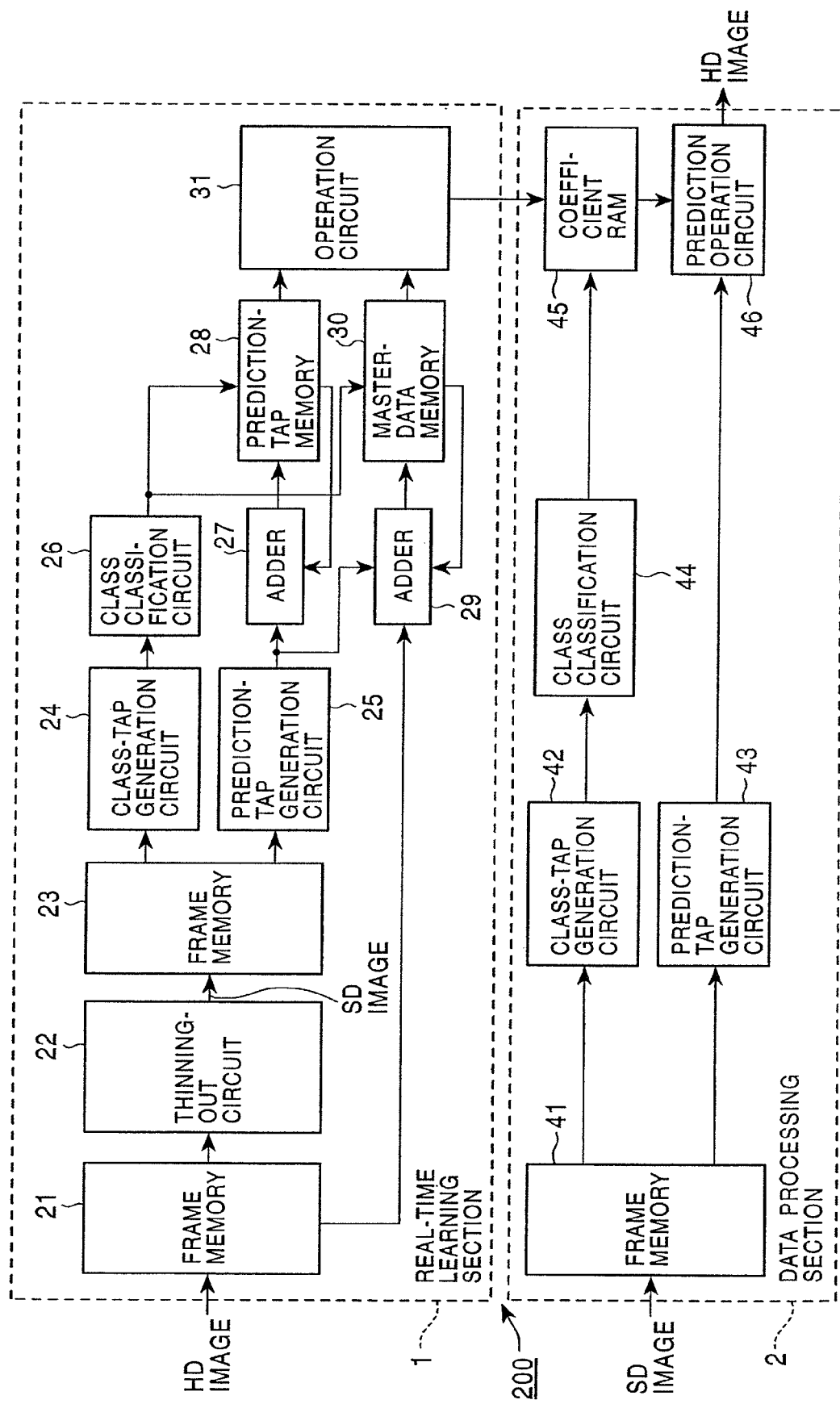
FIG. 9 is a block diagram showing an example structure of an image processing apparatus according to an embodiment of the present invention.

FIG. 9 shows an example structure of an image processing apparatus 200 to which the self-tuning processing circuit shown in FIG. 2 is applied, according to an embodiment.

In this image processing apparatus 200, class classification tuning processing is performed to convert an SD (standard density) image to an HD (high density) image.

The class classification tuning processing is formed of class classification processing and tuning processing. Data is classified into classes according to its structure or nature in the class classification processing, and the tuning processing is applied to each class. The tuning processing is performed in the following way.

Specifically, in the tuning processing, for example, an SD image is linearly coupled with predetermined prediction coefficients to obtain the prediction values of the pixels of an HD image. With this operation, a high-frequency component not included in the SD image is recovered.

More specifically, for example, the prediction value E[y] of the pixel value "y" of a pixel, namely, an HD pixel, constituting the HD image is obtained by a linear first-order coupling model defined by linear coupling of the pixel values, namely, learning data, $x_1, x_2, \ldots$ of several SD pixels, that is, pixels constituting the SD image, and the predetermined prediction coefficients $w_1, w_2, \ldots$. The prediction value E[y] can be expressed by the following expression.

$$E[y]=w_1x_1+w_2x_2+ \quad (12)$$

To generalize the expression (12), when a matrix "W" formed of a set of prediction coefficients "w," a matrix "X" formed of a set of learning data, and a matrix "Y'" formed of a set of prediction values E[y] are defined in the following expressions, $$X = \begin{bmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{bmatrix}$$

$$W = \begin{bmatrix} w_1 \\ w_2 \\ \ldots \\ w_n \end{bmatrix}, Y' = \begin{bmatrix} E[y1] \\ E[y2] \\ \ldots \\ E[ym] \end{bmatrix}$$

the following observation equation is satisfied.

$$XW=Y' \quad (13)$$

The least squares are applied to this observation equation to obtain prediction values E[y] close to the pixel values "y" of the HD pixels serving as master data. When a matrix "Y" formed of a set of the true pixel values "y" of HD pixels serving as master data and a matrix "E" formed of a set of the remainders "e" of the prediction values E[y] against the pixel values "y" of the HD pixels are defined in the following way, $$E = \begin{bmatrix} e_1 \\ e_2 \\ \ldots \\ e_m \end{bmatrix}, Y = \begin{bmatrix} y_1 \\ y_2 \\ \ldots \\ y_m \end{bmatrix}$$

the following remainder equation is satisfied from the expression (13).

$$XW=Y+E \quad (14)$$

In this case, prediction coefficients $w_i$ used to obtain prediction values E[y] close to the pixel values "y" of the HD pixels are obtained when the following error square is made minimum.

$$\sum_{i=1}^{m} e_i^2$$

Therefore, when the result obtained by differentiating the above error square by the prediction coefficient $w_i$ is zero, in other words, the prediction coefficient $w_i$ which satisfies the following expression is the most appropriate value for obtaining the prediction values E[y] close to the pixel values "y" of the HD pixels.

$$e_1 \frac{\partial e_1}{\partial w_i} + e_2 \frac{\partial e_2}{\partial w_i} + \ldots + e_m \frac{\partial e_m}{\partial w_i} = 0 (i = 1, 2, \ldots, n) \quad (15)$$

When the expression (14) is differentiated by the prediction coefficient $w_i$, the following expression is satisfied.

$$\frac{\partial e_i}{\partial w_1} = x_{i1}, \frac{\partial e_i}{\partial w_2} = x_{i2}, \ldots, \frac{\partial e_i}{\partial w_n} = x_{in}, (i = 1, 2, \ldots, m) \quad (16)$$

From the expressions (15) and (16), the expression (17) is obtained.

$$\sum_{i=1}^{m} e_i x_{i1} = 0, \sum_{i=1}^{m} e_i x_{i2} = 0, \ldots \sum_{i=1}^{m} e_i x_{in} = 0 \quad (17)$$

In addition, when the relationships among the learning data "x," the prediction coefficients "w," the master data "y," and the remainders "e" in the remainder equation (14) are taken into account, the following normal equations are obtained from the expression (17).

$$\begin{cases} \left(\sum_{i=1}^{m} x_{i1}x_{i1}\right)w_1 + \left(\sum_{i=1}^{m} x_{i1}x_{i2}\right)w_2 + \ldots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \ldots + \left(\sum_{i=1}^{m} x_{i2}x_{in}\right)w_n = \left(\sum_{i=1}^{m} x_{i2}y_i\right) \\ \ldots \\ \left(\sum_{i=1}^{m} x_{in}x_{i1}\right)w_1 + \left(\sum_{i=1}^{m} x_{in}x_{i2}\right)w_2 + \ldots + \left(\sum_{i=1}^{m} x_{in}x_{in}\right)w_n = \left(\sum_{i=1}^{m} x_{in}y_i\right) \end{cases} \quad (18)$$

When the learning data "x" and the master data "y" of appropriate numbers are prepared, the normal equations (18) of the same number as that of the prediction coefficients "w" to be obtained can be formulated. Therefore, by solving the equations (18), the most appropriate prediction coefficient "w" is obtained. To solve the equations (18), it is required that a matrix formed of coefficients applied to the prediction coefficients "w" be regular. It is possible to use, for example, a sweep off method (Gauss-Jordan deletion method) to solve the equations (18).

The most appropriate prediction coefficient "w" is obtained, as described above, and prediction values E[y] close to the pixel values "y" of HD pixels are obtained from the expression (12) by the use of the prediction coefficient "w" in the tuning processing.

The tuning processing differs from interpolation processing in that a component not included in the SD image but included in the HD image is reproduced. The tuning processing seems to be identical with interpolation processing using a so-called interpolation filter if only the expression (12) is viewed. Since the prediction coefficients "w" corresponding to the tap coefficients of the interpolation filter are obtained by so-called learning with the use of the master data "y," a component included in the HD image can be reproduced. In other words, a high-resolution image can be easily obtained. Therefore, it can be said that the tuning processing has a so-called image creation effect, namely, a resolution improvement effect.

The image processing apparatus 200 shown in FIG. 9 converts an SD image to an HD image by the tuning processing described above.

In other words, an SD image is input to the image processing apparatus 200 as input data to be processed and an HD image is input as input learning data. The SD image serving as the input data to be processed can be an SD image broadcasted in TV broadcasting. The HD image serving as input learning data can be an HD image to be broadcasted together with an SD image through a satellite. In addition, the HD image serving as input learning data can be an HD image obtained by applying the above-described class classification tuning processing to an SD image. It is preferred that the contents of the SD image are identical with those of the HD image.

In FIG. 9, a frame memory 21, a thinning-out circuit 22, a frame memory 23, a class-tap generation circuit 24, a prediction-tap generation circuit 25, a class classification circuit 26, an adder 27, a prediction-tap memory 28, an adder 29, a master-data memory 30, and an operation circuit 31 correspond to the real-time learning section 1 shown in FIG. 2. A frame memory 41, a class-tap generation circuit 42, a prediction-tap generation circuit 43, a class classification circuit 44, a coefficient RAM 45, and a prediction operation circuit 46 correspond to the data processing section 2 shown in FIG. 2. An HD image serving as input learning data is input to the frame memory 21 in the real-time learning section 1, and an SD image serving as input data to be processed is input to the frame memory 41 of the data processing section 2.

In the data processing section 2, the frame memory 41 temporarily stores the SD image serving as the input data to be processed input to the frame memory 41, for example, in units of frames.

The class-tap generation circuit 42 extracts as SD pixels disposed around an HD pixel, that is a focused pixel, for which a prediction value is to be obtained by tuning processing, for example, a block, that is, a processing block, formed of SD pixels disposed within a predetermined distance from the focused pixel, from the SD image, and sends it to the class classification circuit 44 as a class tap to be used in class classification processing.

Figure 10:
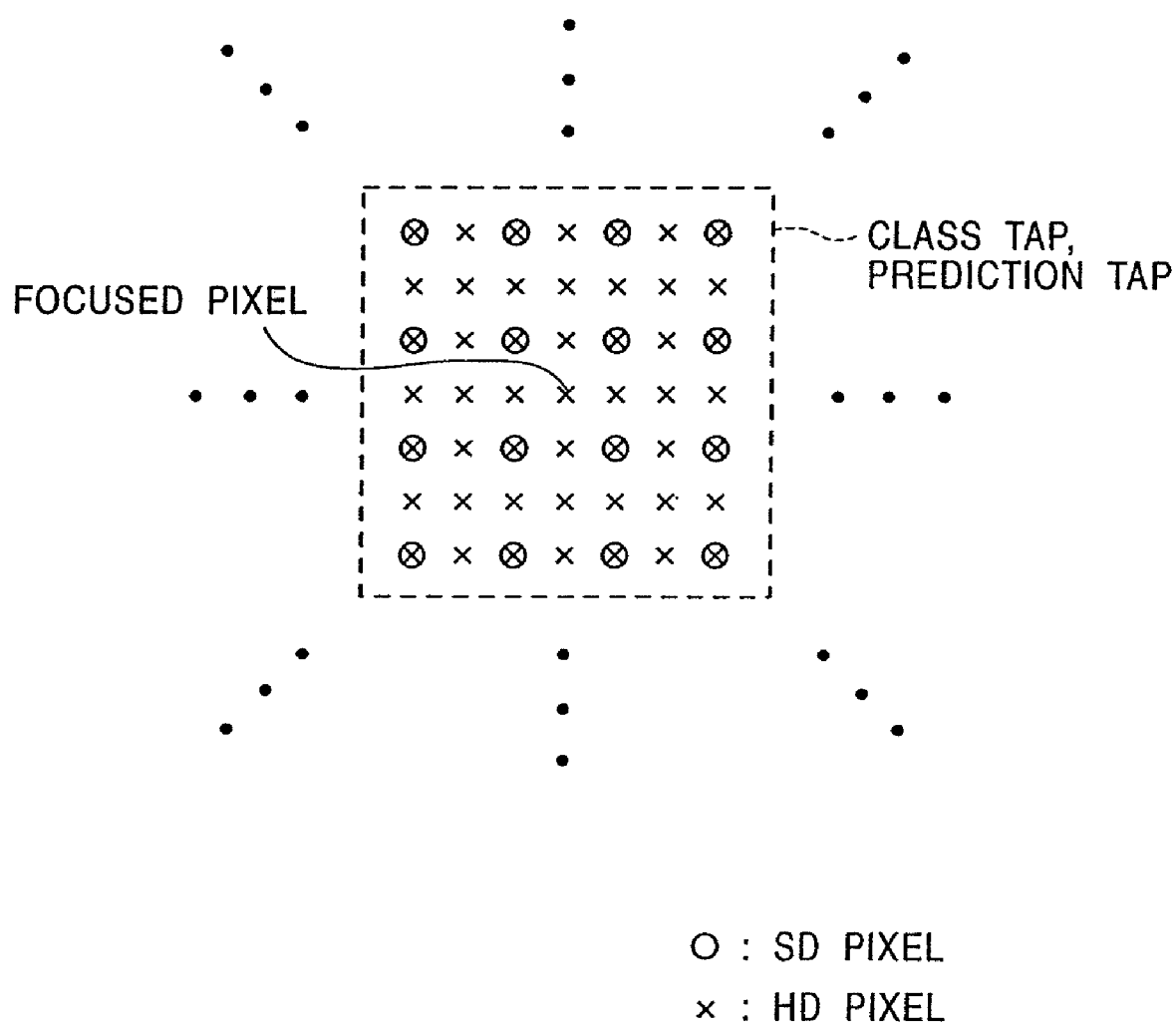
FIG. 10 is a view showing a class tap and a prediction tap to be processed by the image processing apparatus shown in FIG. 9.

In other words, for example, the class-tap generation circuit 42 extracts a class tap formed of four-by-four SD pixels indicated by ∘ marks around the focused pixel from the SD image, as shown in FIG. 10, and outputs it to the class classification circuit 44 as a class tap for the focused pixel. In the embodiment shown in FIG. 10, the SD image has half the number of pixels of the HD image in each of the horizontal and vertical directions.

The prediction-tap generation circuit 43 extracts SD pixels to be used for obtaining the prediction value of the focused pixel in the prediction operation circuit 46, and sends them to the prediction operation circuit 46 as a prediction tap. In other words, for example, the prediction-tap generation circuit 43 extracts the same SD pixels as those extracted as the class tap by the class-tap generation circuit 42 from the SD image as a prediction tap, as shown in FIG. 10, and sends them to the prediction operation circuit 46.

In this embodiment, the class tap and the prediction tap are formed of the same SD pixels. The class tap and the prediction tap are, however, not necessarily formed of the same SD pixels.

The class classification circuit 44 class-classifies the focused pixel according to the class tap sent from the class-tap generation circuit 42, and sends the class obtained by the class-classification to the coefficient RAM 45 as an address. More specifically, the class classification circuit 44 sets the class of the focused pixel to the value corresponding to the pattern of the pixel values of SD pixels constituting the class tap, for example, a predetermined number of SD pixels, and outputs the class to the coefficient RAM 45 as an address.

Specifically, the class classification circuit 44 outputs, for example, the value corresponding to the pattern of the pixel values of four-by-four, 16, SD pixels around the focused pixel, serving as the class tap, as shown in FIG. 10, as the class of the focused pixel.

When the pixel value of each SD pixel is indicated by many bits such as eight bits, the number of the patterns of the pixel values of 16 SD pixels is as enormous as $(2^8)^{16}$ and subsequent quick processing is difficult.

As preprocessing of class classification, processing for reducing the number of the bits of each SD pixel constituting a class tap, for example, the ADRC processing, can be applied to the class tap. This processing needs to reduce the number of bits, and may be quantization processing by the use of a quantization table.

When the ADRC processing is applied and the value of each pixel constituting the class tap is indicated by one bit, the number of the patterns of the pixel values of 16 SD pixels becomes $(2^1)^{16}$, which is very much smaller than that obtained when the ADRC processing is not performed.

The coefficient RAM 45 stores the prediction coefficients of each class obtained when the real-time learning section 1 performs real-time learning. When the class classification circuit 44 sends a class, the prediction coefficients stored at the address corresponding to the class are read and sent to the prediction operation circuit 46. The coefficient RAM 45 updates the storage contents every time the real-time learning section 1 sends the prediction coefficients of each class. Before the real-time learning section 1 sends the first prediction coefficients to the coefficient RAM 45, the coefficient RAM 45 stores the predetermined initial values of the prediction coefficients of each class.

The prediction operation circuit 46 uses the prediction coefficients w, $w_2$, . . . of the class of the focused pixel sent from the coefficient RAM 45 and the prediction tap $x_1, x_2, \ldots$ sent from the prediction-tap generation circuit 43 to perform the operation indicated by the expression (12). The prediction value E[y] of the focused pixel "y" is obtained and output as the pixel value of an HD pixel.

On the other hand, in the real-time learning section 1, the frame memory 21 temporarily stores an HD image input to the frame memory 21 as input learning data, for example, in units of frames. The thinning-out circuit 22 reads an HD image which is to serve as master data "y" in prediction-coefficient real-time learning from the frame memory 21, thins out pixels from the HD image to change it to an SD image, and sends to the frame memory 23. The frame memory 23 temporarily stores the SD image sent from the thinning-out circuit 22.

The class-tap generation circuit 24 and the prediction-tap generation circuit 25 extract the class tap and the prediction tap of the focused pixel, respectively, from SD pixels constituting the SD image stored in the frame memory 23 in the same way as the class-tap generation circuit 42 and the prediction-tap generation circuit 43, and send to the class classification circuit 26, the adder 27, and the adder 29.

The class classification circuit 26 performs class classification according to the class tap sent from the class-tap generation circuit 24, obtains the class of the focused pixel, and sends it to the prediction-tap memory 28 and to the master-data memory 30 as an address, in the same way as the class classification circuit 44.

The adder 27 reads stored values at the address corresponding to the class output from the class classification circuit 26, that is, the operation results corresponding to the multipliers of the prediction coefficients "w" in the expressions (18), from the prediction-tap memory 28, and adds the stored values to the multipliers of the prediction coefficients "w" calculated from the SD pixels constituting the prediction tap sent from the prediction-tap generation circuit 25 to perform the operation corresponding to the summation ($\Sigma$) serving as the multiplier of the prediction coefficient "w" at the left side of each of the normal equations (18). The adder 27 stores the operation result in the prediction-tap memory 28 at the address corresponding to the class output from the class classification circuit 26, in a writing-over manner.

The prediction-tap memory 28 reads a stored value at the address corresponding to the class output from the class classification circuit 26, sends it to the adder 27, and stores the output of the adder 27 at the address.

The adder 29 reads the master data serving as the focused pixel among the HD pixels constituting the HD image stored in the frame memory 21; the SD pixels sent from the prediction-tap generation circuit 25; and a stored value at the address corresponding to the class output from the class classification circuit 26, that is, the multiplication results of the focused pixel and the SD pixels corresponding to the right side of each of the expressions (18), from the master data memory 30, and adds the stored value to the multiplication result of the focused pixel read from the frame memory 21 and the SD pixels sent from the prediction-tap generation circuit 25 to perform the operation corresponding to the summation ($\Sigma$) at the right side of each of the normal equations (18). The adder 29 stores the operation result in the master-data memory 30 at the address corresponding to the class output from the class classification circuit 26, in a writing-over manner.

In other words, the adders 27 and 29 perform multiplication shown in the expressions (18). Since the right side of each of the expressions (18) includes the multiplication of the master data "y" and an SD pixel "x," the SD pixel "x" is required for the multiplication performed by the adder 29, in addition to the master data "y."

The master-data memory 30 reads a stored value at the address corresponding to the class output from the class classification circuit 26, sends it to the adder 29, and stores the output of the adder 29 at the address.

The operation circuit 31 sequentially reads stored values at the address corresponding to each class from the prediction-tap memory 28 and the master-data memory 30, formulates the normal equations shown in the expressions (18), and solves the equations to obtain the prediction coefficients in each class. Specifically, the operation circuit 31 uses the stored values at the address corresponding to each class from the prediction-tap memory 28 and the master-data memory 30 to formulate the normal equations shown in the expressions (18), solves the equations to obtain the prediction coefficients in each class, and sends them to the coefficient RAM 45.

The processing of the data processing section 2 shown in FIG. 9 will be described next by referring to a flowchart shown in FIG. 11. The operation of each circuit is controlled by a controller not shown.

The data processing section 2 receives the SD image serving as the input data to be processed. The frame memory 41 sequentially stores the SD image serving as the input data to be processed, for example, in units of frames.

In the data processing section 2, in a step S21, the class-tap generation circuit 42 and the prediction-tap generation circuit 43 read SD pixels disposed around an HD pixel for which a prediction value is to be obtained by tuning processing, from the frame memory 41 to configure a class tap and a prediction tap, respectively. The class tap and the prediction tap are sent to the class classification circuit 44 and the prediction operation circuit 46, respectively.

When the class classification circuit 44 receives the class tap from the class-tap generation circuit 42, it obtains the class of the focused pixel according to the class tap and sends it to the coefficient RAM 45 as an address in a step S22. The coefficient RAM 45 reads prediction coefficients stored at the address corresponding to the class sent from the class classification circuit 44, and sends it to the prediction operation circuit 46 in a step S23.

The prediction operation circuit 46 uses the prediction tap sent from the prediction-tap generation circuit 43 and the prediction coefficients sent from the coefficient RAM 45 to perform the operation shown in the expression (12) in a step S24. The prediction value E[y] of the focused pixel "y" is obtained and the processing proceeds to a step S25. In the step S25, the prediction-coefficient operation circuit 46 outputs the prediction value E[y] of the focused pixel "y" obtained in the step S24 as the pixel value of an HD pixel, and the processing proceeds to a step S26.

In the step S26, it is determined whether all the HD pixels constituting the one-frame HD image corresponding to a one-frame SD image stored in the frame memory 41 have been processed as focused pixels. When it is determined that all the HD pixels have not yet been processed, the processing returns to the step S21 and the same processing is repeated with an HD pixel not yet serving as a focused pixel being handled as a focused pixel.

On the other hand, in the step S26, when it is determined that all the HD pixels constituting the one-frame HD image have been processed as focused pixels, the processing is terminated.

Figure 11:
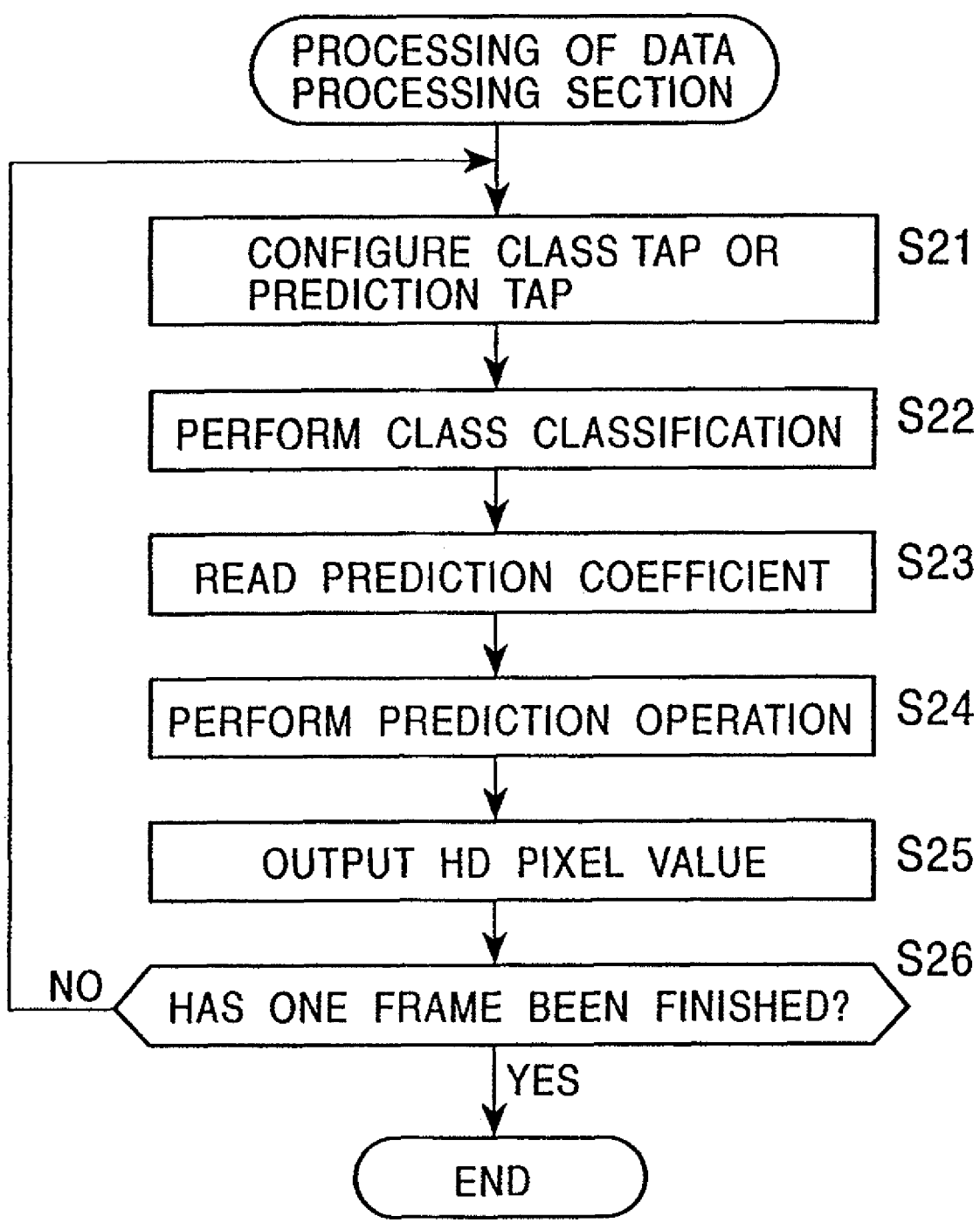
FIG. 11 is a flowchart showing the processing of a data processing section 2 shown in FIG. 9.

The processing illustrated in the flowchart of FIG. 11 is performed, for example, every time a new SD image is stored in the frame memory 41.

Next, the processing of the real-time learning section 1 shown in FIG. 9 will be described by referring to a flowchart shown in FIG. 12. The operation of each circuit is controlled by a controller not shown.

The real-time learning section 1 receives an HD image serving as input learning data. The frame memory 21 sequentially stores the HD image serving as the input learning data, for example, in units of frames.

In a step S31, the thinning-out circuit 22 reads the HD image stored in the frame memory 21 and thins out pixels from the HD image to change it to an SD image. This SD image is sent to the frame memory 23 and stored in it.

When the SD image is stored in the frame memory 23, the class-tap generation circuit 24 and the prediction-tap generation circuit 25 use SD pixels constituting the SD image stored in the frame memory 23 to configure the class tap and the prediction tap of the focused pixel, a predetermined pixel among HD pixels constituting the HD image stored in the frame memory 21, from SD pixels disposed around the focused pixel, respectively, and send to the class classification circuit 26, the adder 27, and the adder 29 in a step S32.

In a step S33, the class classification circuit 26 uses the class tap sent from the class-tap generation circuit 24 to perform class classification, obtains the class corresponding to the focused pixel, and sends it to the prediction-tap memory 28 and to the master-data memory 30 as an address.

The processing proceeds to a step S34, and the prediction tap and the master data are added to respective related values.

Specifically, in the step S34, the prediction-tap memory 28 reads a stored value at the address corresponding to the class output from the class classification circuit 26 and sends it to the adder 27. The adder 27 adds the stored value sent from the prediction-tap memory 28 to the multiplication results of the predetermined SD pixels constituting the prediction tap sent from the prediction-tap generation circuit 25 to perform the operation corresponding to the summation (Σ) serving as the multiplier of the prediction coefficient at the left side of each of the normal equations (18). The adder 27 stores the operation result in the prediction-tap memory 28 at the address corresponding to the class output from the class classification circuit 26, in a writing-over manner.

In the step S34, the master-data memory 30 reads a stored value at the address corresponding to the class output from the class classification circuit 26 and sends it to the adder 29. The adder 29 reads the focused pixel among the HD pixels constituting the HD image stored in the frame memory 21 as master data (further reads the predetermined SD pixels constituting the prediction tap sent from the prediction-tap generation circuit 25); and adds the multiplication results of the master data and the predetermined SD pixels to the stored value sent from the master-data memory 30 to perform the operation corresponding to the summation (Σ) at the right side of each of the normal equations (18). The adder 29 stores the operation result in the master-data memory 30 at the address corresponding to the class output from the class classification circuit 26, in a writing-over manner.

Then, the processing proceeds to a step S35, and it is determined whether all the HD pixels constituting the one-frame HD image stored in the frame memory 21 have been processed as focused pixels. When it is determined that all the HD pixels have not yet been processed, the processing returns to the step S32 and the same processing is repeated with an HD pixel not yet serving as a focused pixel being handled as a focused pixel.

On the other hand, in the step S35, when it is determined that all the HD pixels constituting the one-frame HD image have been processed as focused pixels, the processing proceeds to a step S36. The operation circuit 31 sequentially reads stored values at the address corresponding to each class from the prediction-tap memory 28 and the master-data memory 30, formulates the normal equations shown in the expressions (18), and solves the equations to obtain the prediction coefficients in each class. In addition, the operation circuit 31 sends the obtained prediction coefficients of each class to the coefficient RAM 45 and stores them in it, and the processing is terminated.

Figure 12:
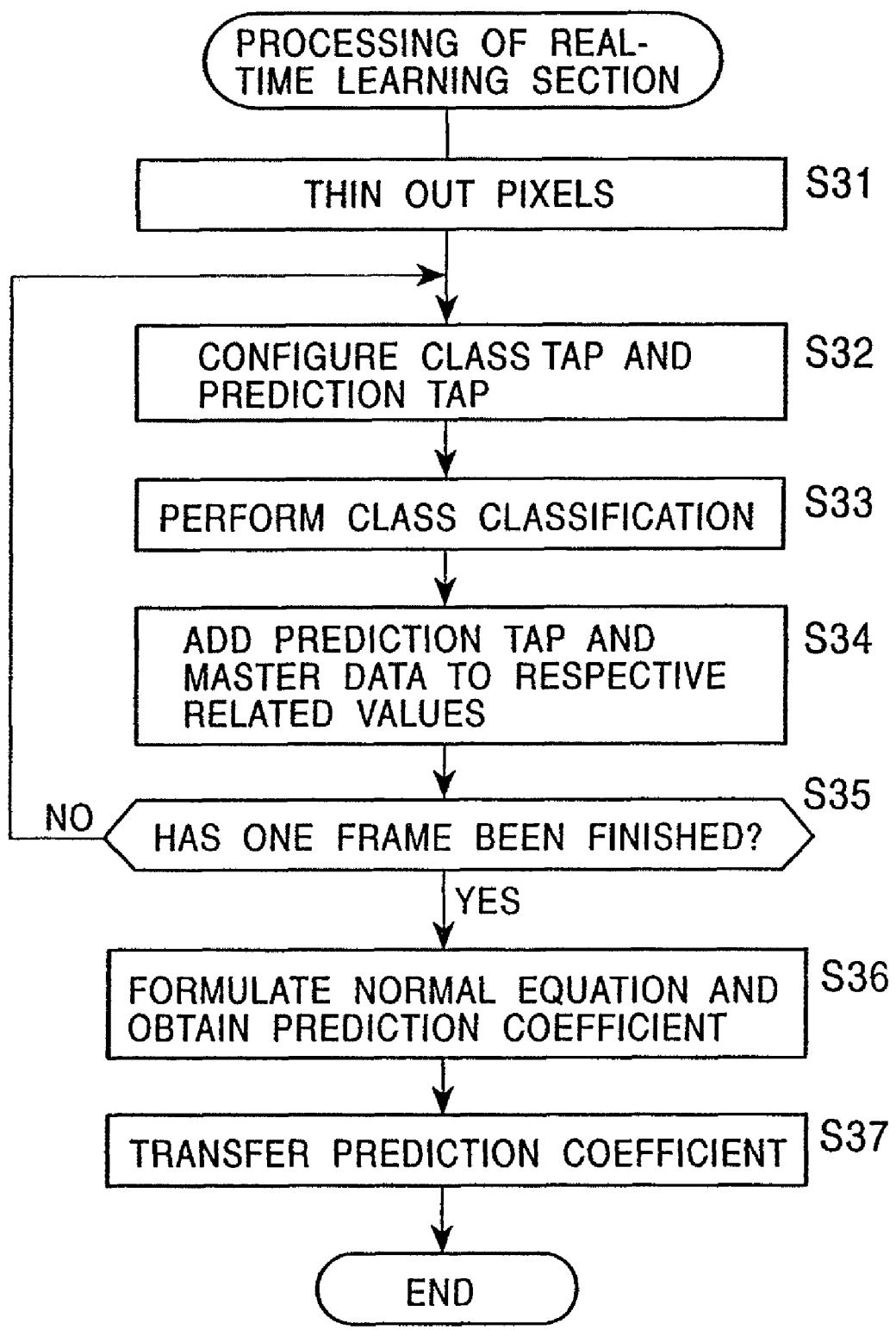
FIG. 12 is a flowchart showing the processing of a real-time learning section 1 shown in FIG. 9.

With these operations, the prediction coefficients of each class stored in the coefficient RAM 45 are updated every time the processing shown in the flowchart of FIG. 12 is performed.

The processing shown in the flowchart of FIG. 12 is performed, for example, every time a new HD image is stored in the frame memory 21.

In the learning processing of prediction coefficients performed in the real-time learning section 1, as described above, when the required number of normal equations for obtaining prediction coefficients cannot be obtained in a class, prediction coefficients stored in the coefficient RAM 45 are, for example, not updated and the prediction coefficients specified first is used as is in the processing of the data processing section 2 for the class.

The processing shown in each of the flowcharts of FIGS. 11 and 12 is performed in parallel.

As described above, the storage contents of the prediction-tap memory 28 and the master-data memory 30 are not reset; the prediction tap and the master data are added to respective related values; the normal equations (18) are formulated with the use of the addition results; and the prediction coefficients of each class are obtained in real time in the real-time learning section 1. As a result, the prediction coefficients of each class become more appropriate for the SD image serving as the input data to be processed as learning processing is performed with the use of the HD image serving as input learning data. Therefore, the SD image is adaptively processed and the HD image obtained by the processing is improved every moment as learning proceeds. More specifically, the resolution and other factors of the HD image to be output from the data processing section 2 are improved every moment.

In the real-time learning section 1, the prediction tap can be added to a related value in the adder 27 after at least one of the stored value sent from the prediction-tap memory 28 and the multiplication results of the predetermined SD pixels constituting the prediction tap sent from the prediction-tap generation circuit 25 is multiplied by a predetermined weight. When the adder 27 multiplies the stored value sent from the prediction-tap memory 28 by a weight smaller than the multiplication results of the predetermined SD pixels constituting the prediction tap sent from the prediction-tap generation circuit 25, the real-time learning section 1 can learn prediction coefficients while an HD image serving as past input learning data is ignored at a predetermined rate. When the adder 27 performs the above-described weighting, the same weighting operation is necessary for the addition in the adder 29.

In addition, when the above-described weight (ignoring) is employed, the real-time learning section 1 can be configured such that the S/N ratio is determined from a signal in the blanking period in TV broadcasting; and a weight for an obtained prediction tap is increased when the S/N ratio is high, and a weight for an obtained prediction tap is reduced when the S/N ratio is low. In this case, the real-time learning section 1 can perform learning with a noise effect being reduced.

The real-time learning section 1 is configured such that a change in scene is detected and a weight applied to the stored value sent from the prediction-tap memory 28 is set to zero when the scene is changed. In this case, when the scene is changed, the real-time learning section 1 ignores all past learning and restarts learning from the beginning. Therefore, immediately after the scene is changed, the image quality of the HD image output from the data processing section 2 deteriorates, but the image quality of the HD image output from the data processing section 2 is improved every moment as learning in the real-time learning section 1 proceeds.

In the above case, the SD image serving as the input data to be processed and the HD image serving as the input learning data having the same contents as the SD image are broadcasted together. The SD image serving as the input data to be processed and the HD image serving as the input learning data can be broadcasted at different timing. In this case, it is necessary for the image processing apparatus 200 shown in FIG. 9 to send the SD image serving as the input data to be processed to the data processing section 2 when it is received and to send the HD image serving as the input learning data to the real-time learning section 1 when it is received.

Figure 13:
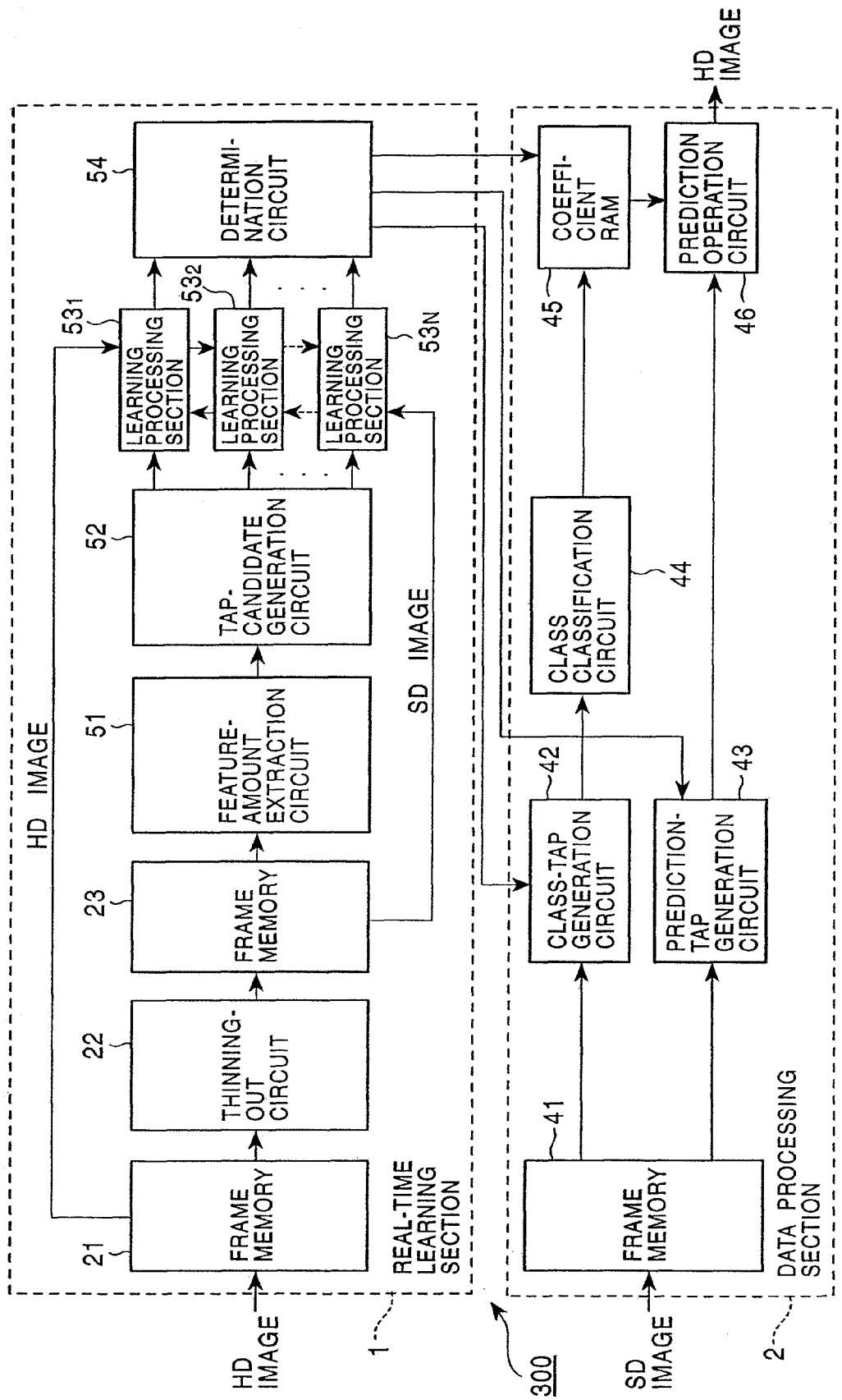
FIG. 13 is a block diagram showing an example structure of an image processing apparatus according to another embodiment of the present invention.

FIG. 13 shows an example structure of an image processing apparatus 300 to which the self-tuning processing circuit shown in FIG. 2 is applied, according to another embodiment. The same symbols as those used in FIG. 9 are assigned to the portions corresponding to those in FIG. 9, and the descriptions thereof will be omitted, if unnecessary.

Also in this image processing apparatus 300, class classification tuning processing is performed to convert an SD image to an HD image in the same way as in the image processing apparatus 200 shown in FIG. 9. In the image processing apparatus 200 shown in FIG. 9, the structures of a class tap and a prediction tap are fixed to four-by-four SD pixels around a focused pixel as shown in FIG. 10, and real-time learning is applied only to the prediction coefficients of each class. In the image processing apparatus shown in FIG. 13, however, real-time learning is applied not only to the prediction coefficients of each class but to the structures of a class tap and a prediction tap.

Specifically, a real-time learning section 1 shown in FIG. 13 includes a frame memory 21, a thinning-out circuit 22, a frame memory 23, a feature-amount extraction circuit 51, a tap-candidate generation circuit 52, N learning processing sections $53_1$ to $53_N$, and a determination circuit 54.

The feature-amount extraction circuit 51 reads an SD image obtained by thinning out pixels from an HD image serving as input learning data and stored in a frame memory 23, extracts a feature amount of the SD image, and sends it to the tap-candidate generation circuit 52.

More specifically, the feature-amount extraction circuit 51, for example, calculates correlation of an SD pixel, a pixel to be processed, constituting the SD image stored in the frame memory 23 with an SD pixel disposed in the vicinity in terms of space and time of the pixel to be processed, one after another. The feature-amount extraction circuit 51 obtains the average of the correlation of all SD pixels constituting the SD image stored in the frame memory 23 as a feature amount of the SD image, and sends it to the tap-candidate generation circuit 52.

The tap-candidate generation circuit 52 generates the structures of a plurality of class taps and prediction taps as class-tap and prediction-tap candidates according to the feature amount sent from the feature-amount extraction circuit 51.

Specifically, the tap-candidate generation circuit 52 generates class-tap and prediction-tap candidates using many SD pixels disposed in the vicinity of the focused pixel when the SD image has a highly correlated feature amount. Hereinafter, a class tap and a prediction tap are collectively called a tap, if necessary. The tap-candidate generation circuit 52 generates tap candidates also using an SD pixel disposed relatively distant from the focused pixel when the SD image has a low correlated feature amount. More specifically, for example, when the SD image has a highly correlated feature amount, tap candidates using SD pixels adjacent to each other are generated, and when the SD image has a low correlated feature amount, tap candidates using SD pixels disposed at an interval of some pixels (such as one pixel or two pixels) are generated.

A plurality of tap candidates are generated, for example, by preparing a standard tap structure for an SD-image feature amount and by widening or narrowing the interval of SD pixels in one or more directions among the horizontal direction, the vertical direction, and the time-domain direction. In the embodiment shown in FIG. 10, taps are configured with SD pixels disposed against the focused pixel in the spacedomain direction. Taps can be configured with the use of SD pixels disposed against the focused pixel in the time-domain direction.

In the embodiment shown in FIG. 13, N tap candidates are generated and each of the N tap candidates is sent to the corresponding section among the learning processing sections $53_1$ to $53_N$ in the tap-candidate generation circuit 52. More specifically, for example, when information indicating the structure of the n-th (n=1, 2, ..., N) tap candidate among the N tap candidates is called tap-structure information #n, the tap-structure information #n is sent to the learning processing section $53_n$.

The learning processing section $53_n$ receives the HD image and the SD image stored in the frame memory 21 and the frame memory 23 as well as the tap-structure information #n. The learning processing section $53_n$ configures a class tap and a prediction tap having the structure corresponding to the tap-structure information #n, and obtains the prediction coefficients of each class in the same way as in the real-time learning section 1 shown in FIG. 9. The learning processing section $53_n$ applies class classification tuning processing to the SD image sent from the frame memory 23 with the use of the prediction coefficients of each class to convert the SD image to an HD image. Then, the learning processing section 53n obtains a prediction error between the converted HD image and the HD image stored in the frame memory 21 and sends it to the determination circuit 54, together with the prediction coefficients of each class obtained by learning and the tap-structure information #n sent from the tap-candidate generation circuit 52.

The determination circuit 54 detects the minimum value among the prediction errors sent from the learning processing sections $53_1$ to $53_N$, sends to the coefficient RAM 45 the prediction coefficients of each class output from the learning processing section, the most appropriate learning processing section, which sends the minimum prediction error among the learning processing sections $53_1$ to $53_N$, and sends the tap-structure information output from the most appropriate learning processing section to a class-tap generation circuit 42 and a prediction-tap generation circuit 43.

Figure 14:
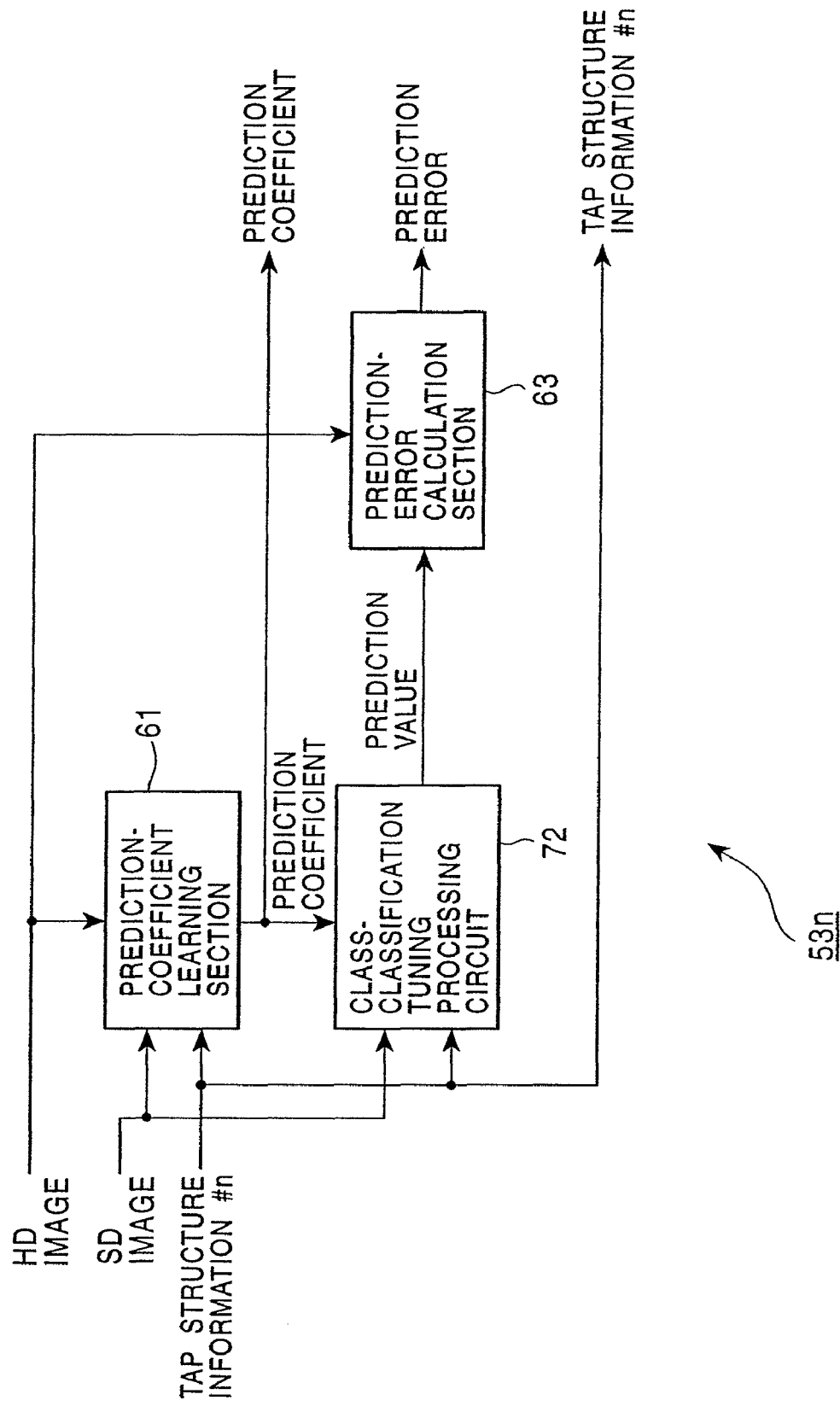
FIG. 14 is a block diagram showing an example structure of a learning processing section 53n shown in FIG. 13.

FIG. 14 shows an example structure of the learning processing section $53_n$ shown in FIG. 13.

The learning processing section $53_n$ is formed of a prediction-coefficient learning section 61, a class-classification tuning processing section 62, and a prediction-error calculation section 63. The prediction-coefficient learning section 61 receives the HD image from the frame memory 21, the SD image from the frame memory 23, and the tap-structure information #n from the tap-candidate generation circuit 52. The class-classification tuning processing section 62 receives the SD image from the frame memory 23, the tap-structure information #n from the tap-candidate generation circuit 52, and the prediction coefficients sent from the prediction-coefficient learning section 61. The prediction-error calculation section 63 receives the HD image from the frame memory 21 and the prediction value sent from the class-classification tuning processing section 62.

The prediction-coefficient learning section 61 uses a class tap and a prediction tap having the structure corresponding to the tap-structure information #n to obtain the prediction coefficients of each class by learning according to the HD image and the SD image in the same way as in the real-time learning section 1 shown in FIG. 9, and sends them to the class-classification tuning processing section 62. The prediction coefficients of each class obtained by the prediction-coefficient learning section 61 are also sent to the determination circuit 54.

The class-classification tuning processing section 62 performs class-classification tuning processing with the use of the prediction coefficients of each class sent from the prediction-coefficient learning section 61 in the same way as in the data processing section 2 in FIG. 9 to obtain the prediction value of an HD pixel from SD pixels constituting the SD image, and sends the prediction value to the prediction-error calculation section 63.

The prediction-error calculation section 63 obtains a prediction error such as the sum square of the differences between an HD pixel constituting the HD image stored in the frame memory 21 and the prediction value of the HD pixel sent from the class-classification tuning processing section 62 corresponding to the HD pixel in the HD image and sends it to the determination circuit 54.

The learning processing section $53_n$ sends the tap-structure information #n sent from the tap-candidate generation circuit 52 to the determination circuit 54, in addition to the prediction coefficients of each class and the prediction error obtained therein.

Figure 15:
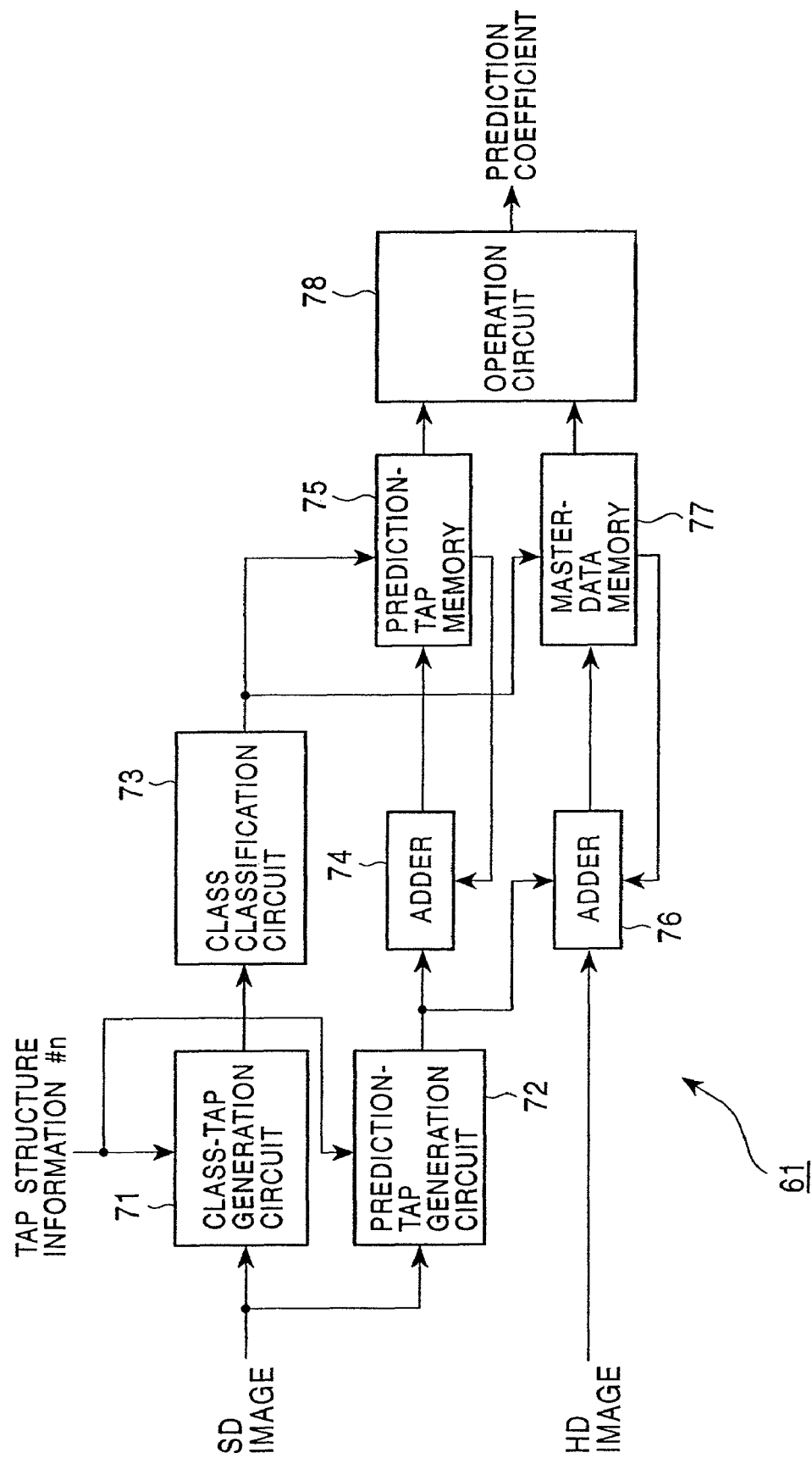
FIG. 15 is a block diagram showing an example structure of a prediction-coefficient learning section 61 shown in FIG. 14.

FIG. 15 shows an example structure of the prediction-coefficient learning section 61 shown in FIG. 14.

The prediction-coefficient learning section 61 is formed of a class-tap generation circuit 71, a prediction-tap generation circuit 72, a class classification circuit 73, an adder 74, a prediction-tap memory 75, an adder 76, a master-data memory 77, and an operation circuit 78, which are configured in the same way as the class-tap generation circuit 24, the prediction-tap generation circuit 25, the class classification circuit 26, the adder 27, the prediction-tap memory 28, the adder 29, the master-data memory 30, and the operation circuit 31 shown in FIG. 9.

The class-tap generation circuit 71 and the prediction-tap generation circuit 72 receive the SD image stored in the frame memory 23, and the adder 76 receives the HD image stored in the frame memory 21 and predetermined SD pixels sent from the prediction-tap generation circuit 72. The prediction coefficients of each class are obtained in the same way as in the real-time learning processing section 1 shown in FIG. 9.

The class-tap generation circuit 71 and the prediction-tap generation circuit 72 also receive the tap-structure information #n output from the tap-candidate generation circuit 52. The class-tap generation circuit 71 and the prediction-tap generation circuit 72 configure a class tap and a prediction tap having the structure corresponding to the tap-structure information #n, respectively.

In the present embodiment, the class tap has the same structure as the prediction tap. The class tap and the prediction tap can have different structures.

Figure 16:
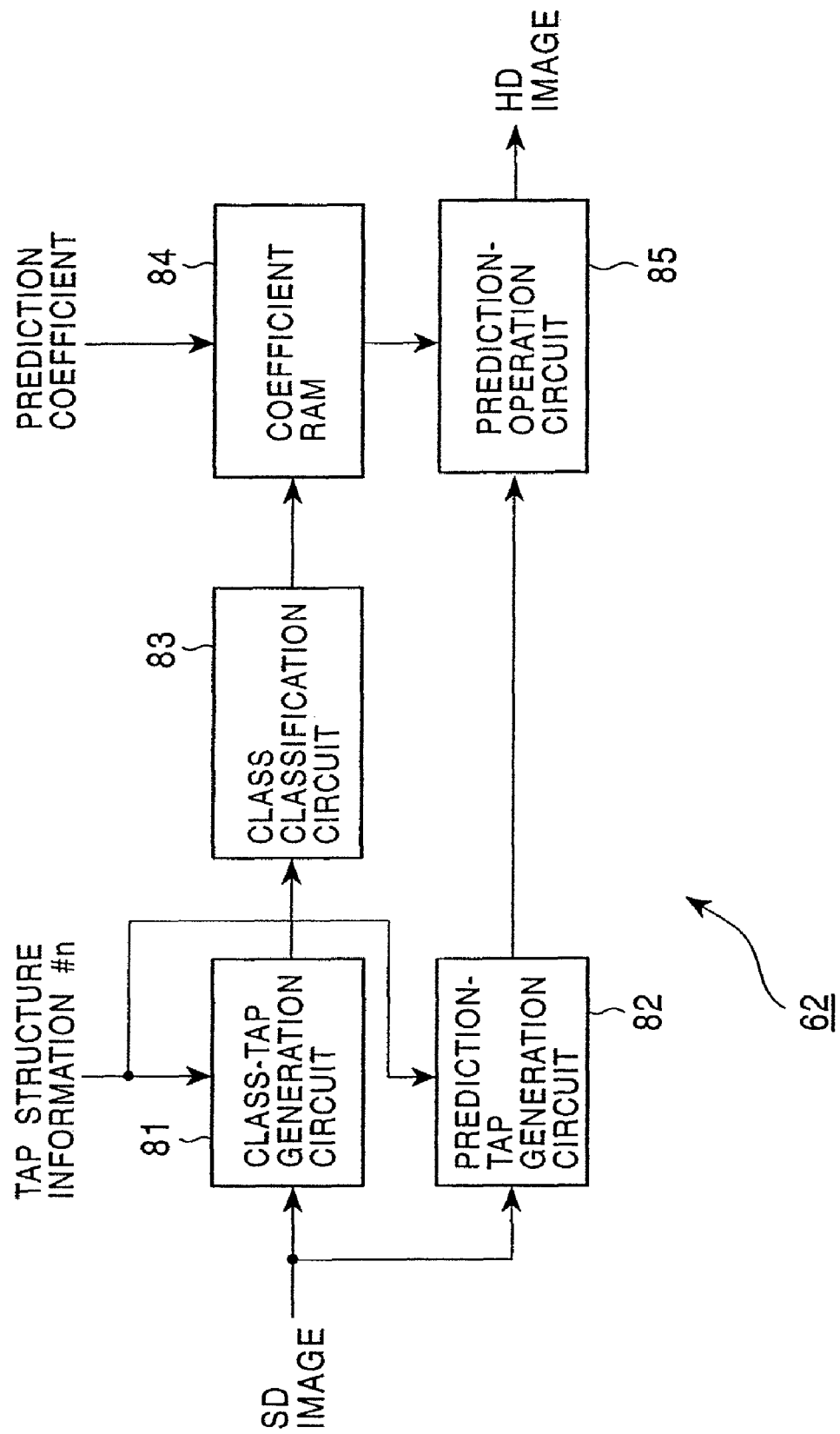
FIG. 16 is a block diagram showing an example structure of a class-classification tuning processing section 62 shown in FIG. 14.

FIG. 16 shows an example structure of the class-classification tuning processing section 62 shown in FIG. 14.

The class-classification tuning processing section 62 is formed of a class-tap generation circuit 81, a prediction-tap generation circuit 82, a class classification circuit 83, a coefficient RAM 84, and a prediction operation circuit 85 which are configured in the same way as the class-tap generation circuit 42, the prediction-tap generation circuit 43, the class classification circuit 44, the coefficient RAM 45, and the prediction operation circuit 46 shown in FIG. 9, respectively.

The class-tap generation circuit 81 and the prediction-tap generation circuit 82 receive the SD image stored in the frame memory 23, and the coefficient RAM 84 receives the prediction coefficients of each class obtained by the operation circuit 78 of the prediction-coefficient learning section 61 shown in FIG. 15. The SD image is converted to an HD image with the use of the prediction coefficients of each class stored in the coefficient RAM 84 in the same way as in the data processing section 2 shown in FIG. 9.

The class-tap generation circuit 81 and the prediction-tap generation circuit 82 also receive the tap-structure information #n output from the tap-candidate generation circuit 52. The class-tap generation circuit 81 and the prediction-tap generation circuit 82 configure a class tap and a prediction tap having the structure corresponding to the tap-structure information #n, respectively, namely, the same structure as the class tap and the prediction tap which the class-tap generation circuit 71 and the prediction-tap generation circuit 72 shown in FIG. 15 configure, respectively.

The processing of the real-time learning section 1 shown in FIG. 13 will be described next by referring to a flowchart shown in FIG. 17. The operation of each circuit is controlled by the controller not shown.

The real-time learning section 1 receives an HD image serving as input learning data. The frame memory 21 sequentially stores the HD image serving as the input learning data, for example, in units of frames.

In a step S41, the thinning-out circuit 22 reads the HD image stored in the frame memory 21 and thins out pixels from the HD image to change it to an SD image. This SD image is sent to the frame memory 23 and stored in it.

When the SD image is stored in the frame memory 23, the feature-amount extraction circuit 51 extracts the feature amount of the SD image sent from the frame memory 23 and sends it to the tap-candidate generation circuit 52, in a step S42. In a step S43, the tap-candidate generation circuit 52 generates N tap candidates according to the feature amount sent from the feature-amount extraction circuit 51 and sends the tap-structure information #1 to #N indicating the structures of the generated tap candidates to the learning processing sections $53_1$ to $53_N$.

The class-tap generation circuit 71 and the prediction-tap generation circuit 72 in the prediction-coefficient learning section 61 shown in FIG. 15 constituting the learning processing section $53_n$ shown in FIG. 14 configure a class tap and a prediction tap with a predetermined pixel among the HD pixels constituting the HD image stored in the frame memory 21 being set to the focused pixel, having the structure corresponding to the tap-structure information #n from the SD pixels stored in the frame memory 21, respectively, and send to the class classification circuit 73, the adder 74, and the adder 76 in a step S44.

In a step S45, the class classification circuit 73 uses the class tap sent from the class-tap generation circuit 71 to perform class classification, obtains the class of the focused HD pixel, and sends it to the prediction-tap memory 28 and to the master-data memory 30 as an address.

On the other hand, the HD pixel serving as the focused pixel is read from the frame memory 21 and sent to the adder 76.

The processing proceeds to a step S46, and the adders 74 and 76 perform additions to generate each term of the normal expression (18) related to the prediction tap and the master data, in the same way as in the step S34 shown in FIG. 12. The addition results are sent to the prediction-tap memory 75 and the master-data memory 77, and stored in them at the address corresponding to the class output from the class classification circuit 73.

Then, it is determined in a step S47 whether all the HD pixels constituting the one-frame HD image stored in the frame memory 21 have been processed as focused pixels. When it is determined that all the HD pixels have not yet been processed, the processing returns to the step S44 and the same processing is repeated with an HD pixel not yet serving as a focused pixel being handled as a focused pixel.

On the other hand, in the step S47, when it is determined that all the HD pixels constituting the one-frame HD image have been processed as focused pixels, the processing proceeds to a step S48. The operation circuit 78 sequentially reads stored values at the address corresponding to each class from the prediction-tap memory 28 and the master-data memory 30, formulates the normal equations shown in the expressions (18), and solves the equations to obtain the prediction coefficients in each class. In addition, the operation circuit 78 sends the obtained prediction coefficients of each class to the coefficient RAM 84 of the class-classification tuning processing section 62 shown in FIG. 16 and stores them in it, namely, updates the storage contents of the coefficient RAM 84.

The class-classification tuning processing section 62 performs class-classification tuning processing with the use of the prediction coefficients of each class stored in the coefficient RAM 84 to convert the SD image stored in the frame memory 23 to an HD image (prediction values of the HD image stored in the frame memory 21) in a step S49.

Specifically, in the class-classification tuning processing section 62 shown in FIG. 16, the class-tap generation circuit 81 and the prediction-tap generation circuit 82 configure a class tap and a generation tap having the structure corresponding to the tap-structure information #n with the use of the SD pixels sent from the frame memory 23, and sends them to the class classification circuit 83 and the prediction operation circuit 85, respectively.

The class classification circuit 83 obtains the class corresponding to the focused pixel in the HD image according to the class tap sent from the class-tap generation circuit 81, and sends it to the coefficient RAM 84 as an address. The coefficient RAM 84 reads prediction coefficients stored at the address corresponding to the class sent from the class classification circuit 83, and sends to the prediction operation circuit 85.

The prediction operation circuit 85 performs the operation shown by the expression (12) with the use of the prediction tap sent from the prediction-tap generation circuit 82 and the prediction coefficients sent from the coefficient RAM 84 to obtain the prediction value E[y] of the focused pixel "y" and sends it to the prediction-error calculation section 63 shown in FIG. 14.

In a step S50, the prediction-error calculation section 63 obtains a prediction error between the prediction value E[y] output from the class-classification tuning processing section 62 and the HD image stored in the frame memory 21, and sends it to the determination circuit 54 shown in FIG. 13 together with the prediction coefficients of each class output from the prediction-coefficient learning section 61 and the tap-structure information #n.

The determination circuit 54 detects the minimum value among the prediction errors sent from the learning processing sections $53_1$ to $53_N$ in a step S51; and sends the prediction coefficients of each class output from the most appropriate learning processing section which has obtained the minimum prediction error among the learning processing sections $53_1$ to $53_N$ to the coefficient RAM 45 of the data processing section 2, and the tap-structure information output from the most appropriate learning processing section to the class-tap generation circuit 42 and the prediction-tap generation circuit 43 of the data processing-section 2 in a step S52. Then, the processing is terminated.

Figure 17:
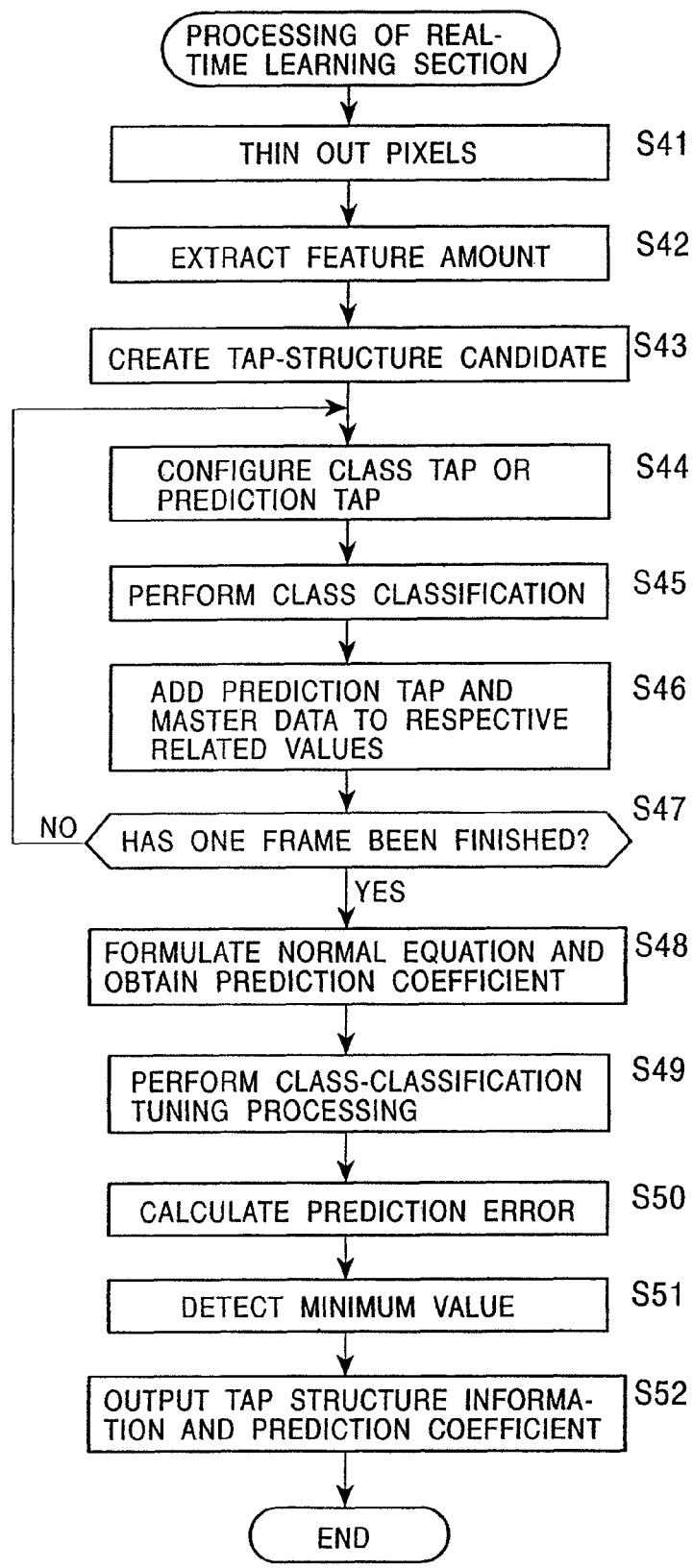
FIG. 17 is a flowchart showing the processing of a real-time learning section 1 shown in FIG. 13.

The processing shown in the flowchart of FIG. 17 is performed, for example, every time a new HD image is stored in the frame memory 21.

In the data processing section 2 shown in FIG. 13, the storage contents of the coefficient RAM 45 are updated by the prediction coefficients of each class sent from the determination circuit 54 of the real-time learning section 1. The class-tap generation circuit 42 and the prediction-tap generation circuit 43 in the data processing section 2 configure a class tap and a prediction tap having the structure corresponding to the tap-structure information sent from the real-time learning section 1, and the SD image is converted to an HD image in the same way as in FIG. 9.

As described above, when the real-time learning section 1 learns the structure of a class tap and a prediction tap in real time in addition to the prediction coefficients of each class, an HD image having a further improved image quality is obtained.

Even when the real-time learning section 1 learns the structure of a class tap in real time, if the above-described weight is introduced in the step S46 of FIG. 17, where additions are made to the prediction tap and the master data of each class, the structure of the class tap can be learned while the HD image serving as past input learning data is ignored at a predetermined rate.

When the structure of the class tap is learned in real time, since the structure of the class tap configured for the focused pixel is changed, the class of the focused pixel, obtained as a result of class classification performed according to the class tap, is also changed.

Figure 18:
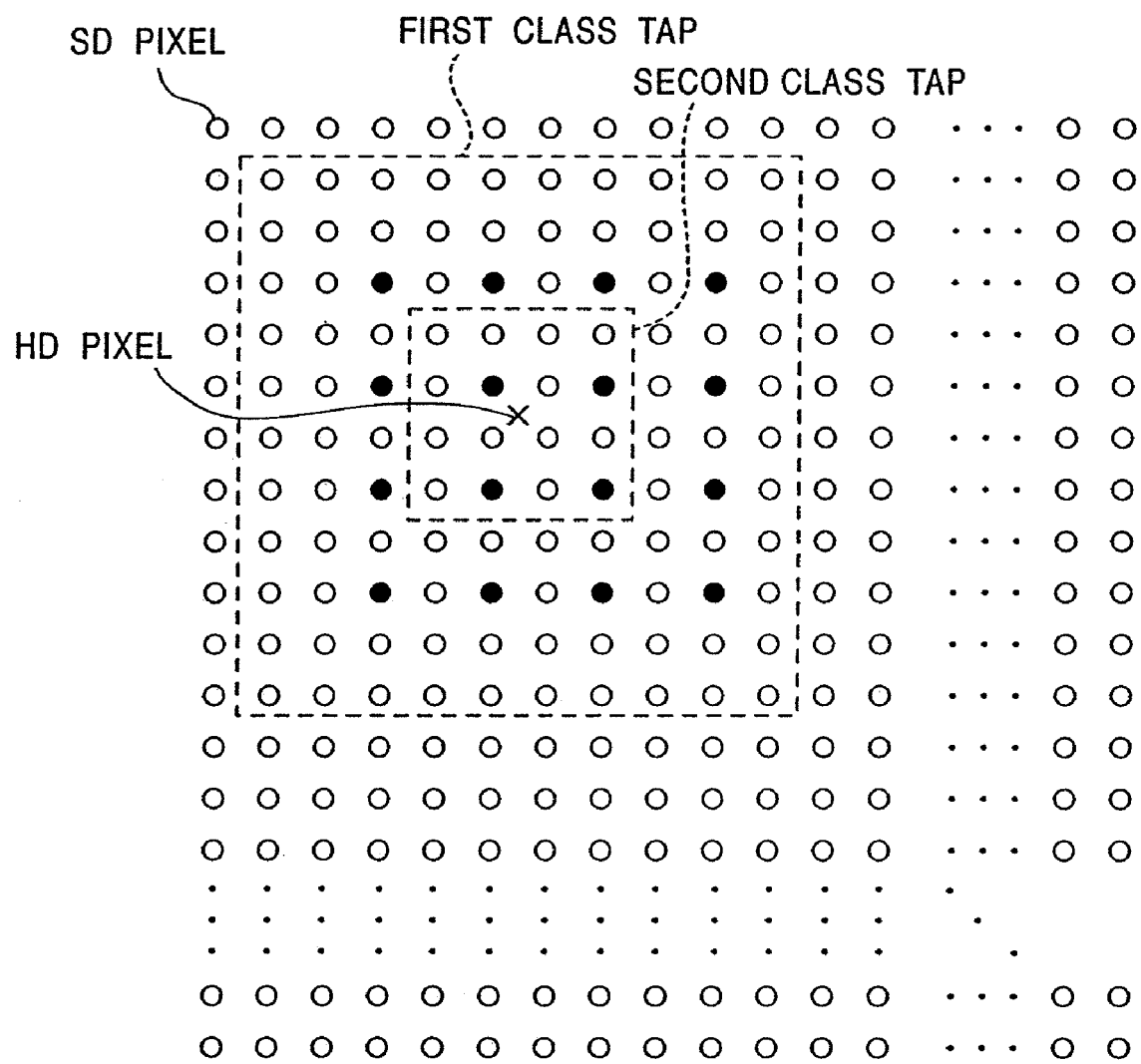
FIG. 18 is a view showing class taps to be processed by the image processing apparatus shown in FIG. 13.

More specifically, for example, to simplify a description, assuming that each SD pixel constituting a class tap is expressed by one bit, and the structure of a class tap is changed, for example, to one of two cases, a case in which the class tap is formed of adjacent four-by-four SD pixels around the focused pixel, as shown in FIG. 10, and a case in which the class tap is formed of four-by-four SD pixels disposed every other pixels around the focused pixel, as shown in FIG. 18, the number of classes required is $2^{16}+2^{16}$. When the class tap is formed of four-by-four SD pixels disposed every other pixels, the focused pixel is not disposed at the center of the SD pixels. The HD focused pixel can be, however, predicted when the real-time learning section 1 learns with the same phase relationship.

In other words, when the class tap is either formed of the adjacent four-by-four SD pixels around the focused pixel or formed of the four-by-four SD pixels disposed every other pixels around the focused pixel, the number of classes required is $2^{16}$ in either case. In contrast, when the class tap can be formed of the adjacent four-by-four SD pixels around the focused pixel and it can also be formed of the four-by-four SD pixels disposed every other pixels around the focused pixel, the number of classes required is $2^{16}$ for a case in which the class tap is formed of the adjacent four-by-four SD pixels around the focused pixel, plus $2^{16}$ for a case in which the class tap is formed of the four-by-four SD pixels disposed every other pixels around the focused pixel.

Since $2^{16}$ classes required when the class tap is formed of the adjacent four-by-four SD pixels around the focused pixel are different from $2^{16}$ classes required when the class tap is formed of the four-by-four SD pixels disposed every other pixels around the focused pixel, when the structure of the class tap is changed, how to perform the addition of the prediction tap in each class and the addition of the master data in each class in the step S46 in FIG. 17, for example, becomes an issue. This can be performed, for example, in the following way.

Specifically, the number of classes which matches the total number of classes required for each structure of a class tap to be employed by real-time learning are prepared in advance, and when a class tap having a certain structure is employed, classes other than the classes assigned to the class tap having the structure are not used, namely, are ignored.

More specifically, when class taps to be employed by real-time learning are, for example, a first class tap formed of 10-by-10 SD pixels around the focused pixel and a second class tap formed of four-by-four SD pixels around the focused pixel, as shown in FIG. 18, since $2^{100}$ and $2^{16}$ classes are required for the first and second class taps, respectively, $2^{100}+2^{16}$ classes are prepared where each SD pixel is expressed by one bit. Among the $2^{100}+2^{16}$ classes, $2^{100}$ and $2^{16}$ classes are assigned to the first and second class taps, respectively. When the first class tap is employed, processing is performed only for the $2^{100}$ classes assigned thereto. When the second class tap is employed, processing is performed only for the $2^{16}$ classes assigned thereto.

When the structure of a prediction tap is changed, the prediction coefficients "w" to be multiplied by SD pixels "x" constituting the prediction tap are also changed in the expression (12). The prediction coefficients in the expressions (18) are also changed. To handle this issue, prediction coefficients are prepared for all SD pixels which can be prediction taps for the focused pixel, and the operation is performed with the pixel values of SD pixels which are not employed as prediction taps being set to zero among the pixel values of the SD pixels serving as multipliers in the expression (12) for the prediction coefficients.

It is also possible that the structure of a class tap is fixed and classes required for the fixed class tap are streamlined by the real-time learning section 1. Specifically, for example, when a class tap is formed of "A" SD pixels and each SD pixel constituting the class tap is expressed by "B" bits, $(2^A)^B$ classes are usually required. The image quality of an HD image output from the data processing section 2 is improved in some cases when the real-time learning section 1 eliminates a class or integrates a class and another class into one class. In other words, the same advantages as in a case when the structure of the class tap is changed are achieved in some cases when the real-time learning section 1 streamlines classes. It is also possible that, for example, the real-time learning section 1 learns class-streamlining in real time such that the above-described prediction error becomes small.

In the above case, the data processing section 2 performs linear processing. The present invention can also be applied to a case when the data processing section 2 performs non-linear processing.

In the embodiment shown in FIG. 13, the learning processing section $53_n$ uses a class tap and a prediction tap having the structure corresponding to the tap-structure information #n sent from the tap-candidate generation circuit 52 as is to obtain prediction coefficients until new tap-structure information #n is received. The learning processing section $53_n$ can be configured such that the feature amount of a focused pixel, such as the correlation of SD pixels disposed around the focused pixel, is obtained, the class tap and the prediction tap having the structure corresponding to the tap-structure information #n is changed for each focused pixel to have a structure based on the feature amount, and prediction coefficients are obtained.

In this case, for example, it is necessary to prepare many classes correspondingly to the number of variations to which the class tap and the prediction tap having the structure corresponding to the tap-structure information #n are modified. In the data processing section 2, in the same way as in the above-described case, it is necessary that the feature amount of a focused pixel is obtained, and the class-tap generation circuit 42 and the prediction-tap generation circuit 43 configure a class tap and a prediction tap having a structure obtained by modifying according to the feature amount the structure corresponding the tap-structure information #n sent from the determination circuit 54. The feature amount can be anything indicating a feature of SD pixels around the focused pixel, such as the DR, dispersion, or standard deviation of the SD pixels.

Embodiments of the present invention have been described by the circuits shown in FIG. 9 and FIG. 13. Software which implements the function of each circuit by a program can be used.

The series of processing shown in FIG. 8, FIG. 11, FIG. 12, and FIG. 17 can be implemented by hardware or software. When the series of processing is achieved by software, a program constituting the software is installed into a computer built in the NR processing apparatus 100 and the image processing apparatuses 200 and 300 serving as special hardware or into a general-purpose computer.

Recording media which store the program for executing the series of processing described above will be described below by referring to FIGS. 19A, 19B, and 19C. The program is installed into a computer and is made executable by the computer.

Figure 19A:
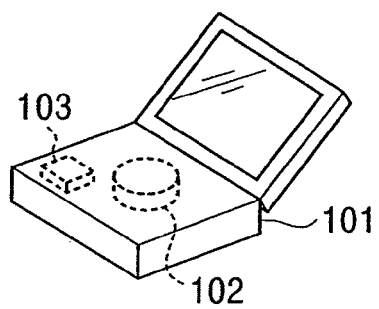
FIG. 19A is a view of a computer into which a program that executes processing related to the present invention is installed.

The program is recorded in advance into a hard disk 102 or a semiconductor memory 103 serving as a recording medium which is built in a computer 101, as shown in FIG. 19A.

Figure 19B:
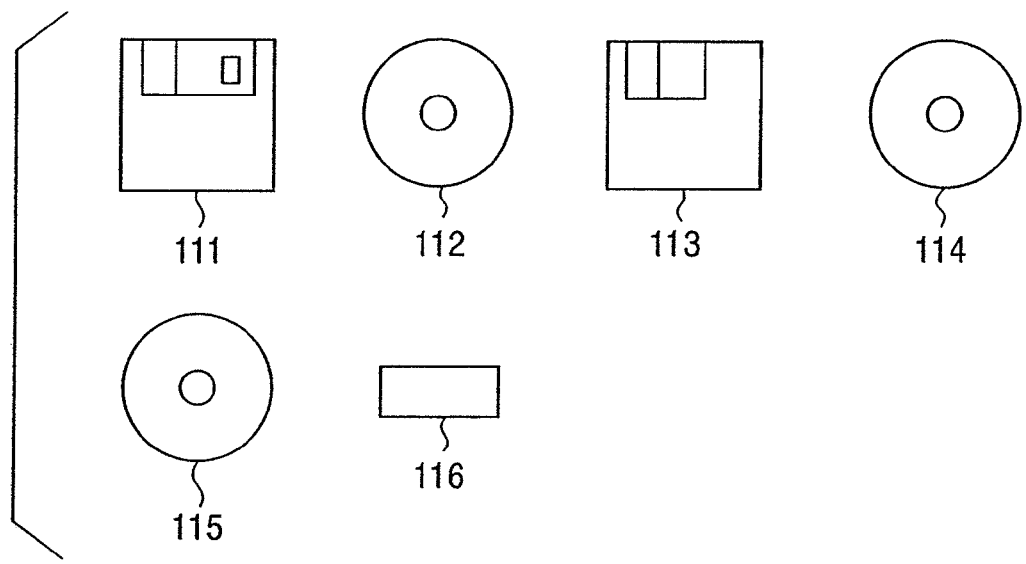
FIG. 19B is a view showing an example storage medium in which a program that executes processing related to the present invention is stored.
Figure 19C:
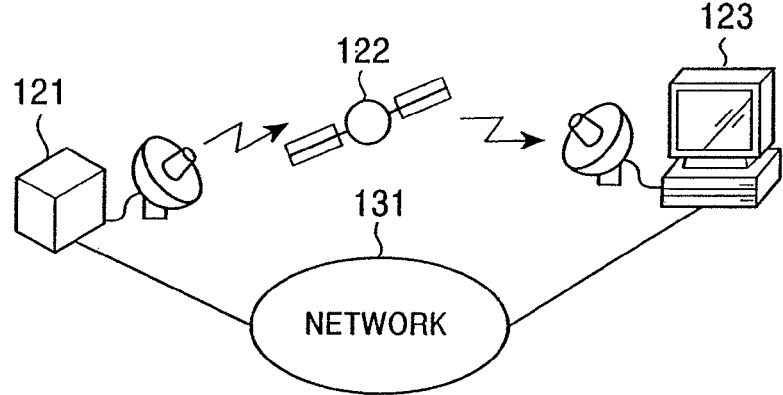
FIG. 19C is a view showing cases in which a program that executes processing related to the present invention is distributed to the computer through a satellite and a network.

Alternatively, the program is recorded temporarily or perpetually into recording media, such as a floppy disk 111, a compact disc read-only memory (CD-ROM) 112, a magneto-optical (MO) disk 113, a digital versatile disk (DVD) 114, a magnetic disk 115, and a semiconductor memory 116, as shown in FIG. 19B.

The program is installed in the computer from the above-described recording medium. Alternatively, the program is transferred by radio from a downloading site 121 to the computer 101 through an artificial satellite for digital satellite broadcasting, or to the computer 101 by wire through a network 131 such as a local area network (LAN) or the Internet; and is installed into the hard disk 102, built in the computer 101, as shown in FIG. 19C.

In the present specification, the steps describing the programs for executing various types of processing are not necessarily processed in a time sequential manner in the order in which the steps are described in the flowcharts. Processing to be executed in parallel or individually, such as parallel processing or processing by objects, is also included.

Figure 20:
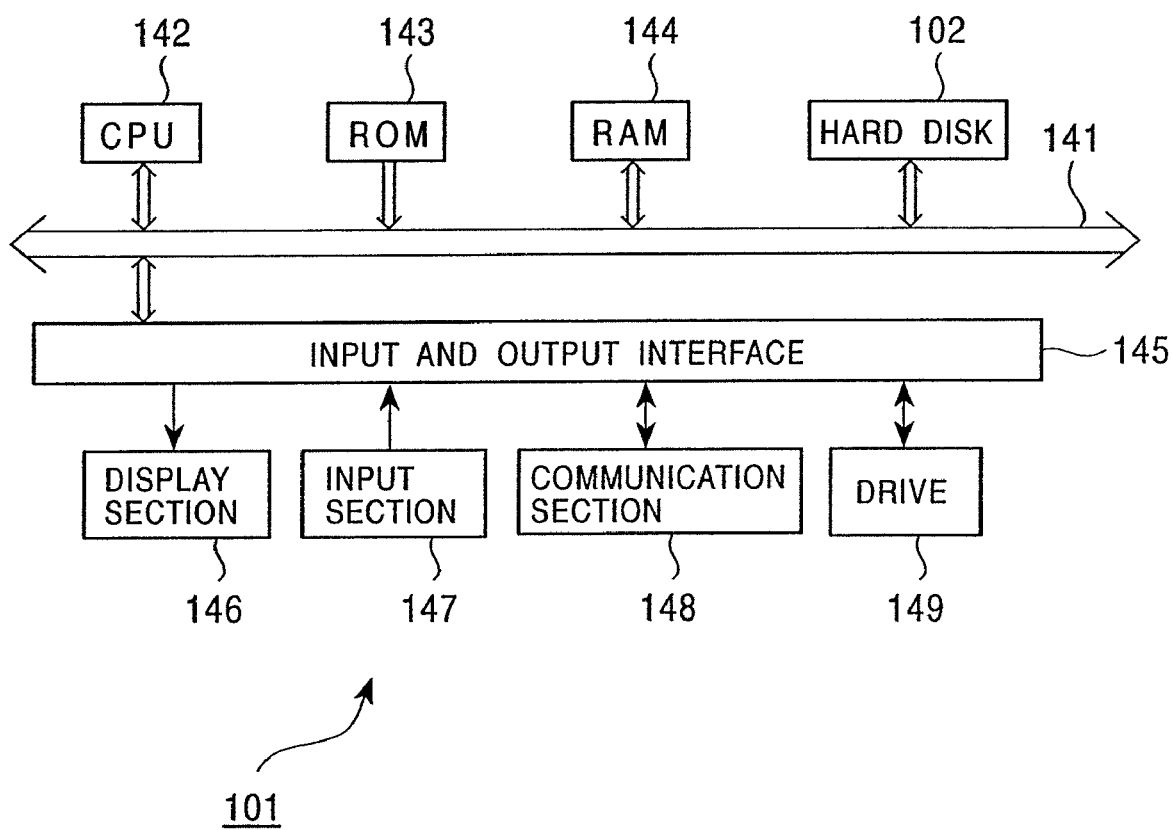
FIG. 20 is a block diagram of a computer into which a program that executes processing related to the present invention is installed.

FIG. 20 shows an example structure of the computer 101 shown in FIG. 19A.

The computer 101 includes a central processing unit (CPU) 142, as shown in FIG. 20. The CPU 142 is connected to an input and output interface 145 through a bus 141. When the user operates an input section 147 formed of a keyboard and a mouse to input a command through the input and output interface 145, the CPU 142 executes a program stored in a read-only memory (ROM) 143 corresponding to the semiconductor memory 103 shown in FIG. 19A. Alternatively, the CPU 142 loads into a random access memory (RAM) 144 a program stored in the hard disk 102; a program transferred through the satellite 122 or the network 131, received by a communication section 148, and installed into the hard disk 102; or a program read from the floppy disk 111, the CD-ROM 112, the MO disk 113, the DVD 114, or the magnetic disk 115 which is loaded into a drive 149, and installed into the hard disk 102; and executes it. The CPU 142 outputs the processing result, for example, through the input and output interface 145 to a display section 146 formed of a liquid-crystal display (LCD), as required.

What is claimed is:

1. A data processing apparatus for processing input data and outputting the processed data, comprising:
    a processor for processing the input data by a linear coupling of the input data and predetermined prediction coefficients and outputting the processed data; and
    a real time learning unit for learning the prediction coefficients in real time so that the output data has higher quality as time elapses and for transferring the prediction coefficients to said processor,
    wherein the real-time learning unit includes a formulator for formulating equations to obtain the prediction coefficients based on at least data of higher quality than the input data, and an output unit for solving said equations and outputting the prediction coefficients;
    whereby the processed output data is determined before a current time.

2. The data processing apparatus of claim 1, wherein said real-time learning unit learns the prediction coefficients according to time-sequentially input learning data.

3. The data processing apparatus of claim 2, wherein said real-time learning unit learns the prediction coefficients while ignoring past learning data at a predetermined rate.

4. The data processing apparatus of claim 1, wherein said formulator formulates the equations based on data of higher quality than the input data and on normal quality data generated by the higher quality data.

5. A data processing method implemented by a computer for processing input data and outputting the processed data, comprising the steps of:
    processing by the computer the input data by a linear coupling of the input data and predetermined prediction coefficients and outputting the processed data; and
    learning by the computer the prediction coefficients in real time so that the output data has higher quality as time elapses, including the steps of:
    formulating by the computer equations to obtain the prediction coefficients based on at least higher quality data than the input data, solving said equations, and outputting the prediction coefficients;
    whereby the processed output data is determined before a current time.

6. A non-transitory computer readable medium for storing a computer controllable program for processing input data and outputting the processed data, the program comprising the steps of:
    processing the input data by a linear coupling of the input data and predetermined prediction coefficients and outputting the processed data; and
    learning the prediction coefficients in real time so that the output data has higher quality as time elapses, including the steps of:
    formulating equations to obtain the prediction coefficients based on at least higher quality data than the input data, solving said equations, and outputting the prediction coefficients;
    whereby the processed output data is determined before a current time.

* * * * *